(12) United States Patent
Akashi

(10) Patent No.: US 10,237,177 B2
(45) Date of Patent: Mar. 19, 2019

(54) TRANSFER DEVICE AND TRANSFER SYSTEM

(71) Applicant: ALAXALA Networks Corporation, Kawasaki-shi, Kanagawa (JP)

(72) Inventor: Dai Akashi, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 191 days.

(21) Appl. No.: 15/219,333

(22) Filed: Jul. 26, 2016

(65) Prior Publication Data
US 2017/0041223 A1 Feb. 9, 2017

(30) Foreign Application Priority Data
Aug. 5, 2015 (JP) .................................. 2015-154691

(51) Int. Cl.
*H04L 12/28* (2006.01)
*H04L 12/721* (2013.01)
*H04L 29/12* (2006.01)

(52) U.S. Cl.
CPC ............ *H04L 45/66* (2013.01); *H04L 61/103* (2013.01); *H04L 61/6009* (2013.01); *H04L 61/6022* (2013.01)

(58) Field of Classification Search
CPC ... H04L 45/66; H04L 61/103; H04L 61/6009; H04L 61/6022
See application file for complete search history.

(56) References Cited

U.S. PATENT DOCUMENTS 7,469,298 B2 * 12/2008 Kitada ................ H04L 12/4645
709/223
7,936,750 B2 * 5/2011 Tsuzuki .................. H04L 45/00
370/389

(Continued)

FOREIGN PATENT DOCUMENTS

JP 2011-199749 A 10/2011
JP 2013-038715 A 2/2013

OTHER PUBLICATIONS

Japanese Office Action received in corresponding Japanese Application No. 2015-154691 dated Oct. 23, 2018.

*Primary Examiner* — Chi H Pham
*Assistant Examiner* — Fahmida S Chowdhury
(74) *Attorney, Agent, or Firm* — Mattingly & Malur, PC

(57) ABSTRACT

A transfer device includes: first and second ports connected to L3 and L2 networks, respectively; a storage unit that stores data processing information which brings a MAC address of a communication device in the L2 network into correspondence with information regarding processing of data, and address information which brings an IP address of the communication device in the L2 network into correspondence with the MAC address thereof; and a transfer unit that, upon receiving data addressed to the communication device in the L2 network through the first port, searches the address information with an IP address in the data to acquire a MAC address corresponding to the IP address, searches the data processing information with the acquired MAC address, and depending on a search result, controls whether to transfer the data through the first port based on information regarding processing of data corresponding to the acquired MAC address.

12 Claims, 14 Drawing Sheets

(56) References Cited

U.S. PATENT DOCUMENTS

| | | | | |
|---|---|---|---|---|
| 2007/0058646 A1* | 3/2007 | Hermoni | H04L 12/18 | 370/401 |
| 2009/0037607 A1* | 2/2009 | Farinacci | H04L 12/4641 | 709/249 |
| 2010/0278185 A1* | 11/2010 | Jarredal | H04L 29/12584 | 370/400 |
| 2013/0007109 A1* | 1/2013 | Matsuhira | H04L 67/1002 | 709/203 |
| 2014/0112349 A1* | 4/2014 | Moreno | H04L 45/64 | 370/400 |

* cited by examiner

| IP ADDRESS (40) | MAC ADDRESS (41) |
|---|---|
| IP_1 | MAC_1 |
| IP_2 | MAC_2 |
| IP_A | MAC_A |
| IP_B | MAC_B |
|  |  |

| MAC ADDRESS (42) | TRAFFIC PROCESSING INFORMATION (43) |
|---|---|
| MAC_1 | TID1, IP_10 |
|  |  |

| IP ADDRESS (44) | TRAFFIC PROCESSING INFORMATION (45) |
|---|---|
| IP_1 | TID1, IP_10 |
|  |  |

TRANSFER DEVICE AND TRANSFER SYSTEM

BACKGROUND OF THE INVENTION

1. Field of the Invention

The present invention relates to a transfer device and a transfer system.

2. Description of the Related Art

There is technology described in JP-2013-38715-A, with which inspection and monitoring are performed to traffic of a user terminal. In JP-2013-38715-A, "technology for making a detour such that communication traffic between a user terminal and a targeted device for communication is routed through a predetermined device which performs analysis, monitoring, and the like" is described. JP-2013-38715-A discloses that a virtual network control device which controls a tunnel connection device connected to an internet protocol (IP) network and a tunnel termination device notifies the tunnel connection device of a detour instruction including an IP address, which may be dynamically assigned, as information for identifying data to be detoured by the tunnel termination device, among data which the tunnel connection device transmits to and receives from a server connected to the IP network.

SUMMARY OF THE INVENTION

In a case of using an IP address which may be dynamically assigned for specifying data to be routed through the tunnel termination device in JP-2013-38715-A, there arises need to perform control following the IP address which may be changed, in other words, control in which a detour instruction is notified from the virtual network control device in accordance with the change of the IP address. Accordingly, processing executed by the tunnel connection device for specifying data to be routed through the tunnel termination device becomes complicated, and a processing load on the tunnel connection device increases.

For the above reason, it is considered that a media access control (MAC) address, which is device-specific information, is used for specifying data to be routed through the tunnel termination device in JP-2013-38715-A. However, there is a following problem. Even if a MAC address of a user terminal is included in the detour instruction from the virtual network control device described in JP-2013-38715-A, the MAC address of the user terminal is not included in data received by the tunnel connection device from the IP network. Consequently, the tunnel connection device cannot specify data to be routed through the tunnel termination device using the MAC address notified from the virtual network control device.

In order to solve the above problem, a transfer device according to an aspect of the present invention includes a first port connected to a layer 3 network, a second port connected to a layer 2 network, a storage unit, and a transfer unit. The storage unit stores data processing information with which a MAC address of a communication device in the layer 2 network and information regarding processing of data are brought into correspondence with each other, and address information with which an IP address and the MAC address of the communication device in the layer 2 network are brought into correspondence with each other. When receiving data addressed to the communication device in the layer 2 network through the first port, the transfer unit searches the address information based on an IP address included in the data to acquire a MAC address corresponding to the IP address included in the data, searches the data processing information based on the acquired MAC address, and depending on a result of the search, controls whether to transfer the data through the first port based on information regarding processing of data corresponding to the acquired MAC address.

According to an aspect of the present invention, a processing load on a transfer device can be reduced. A problem, a configuration and an effect other than those described above will be clarified through descriptions of the following embodiments.

BRIEF DESCRIPTION OF THE DRAWINGS

FIG. 3 is an example of a configuration of an ARP table;

FIG. 4 is an example of a configuration of a user MAC identification table;

FIG. 5 is an example of a configuration of a user IP identification table;

DESCRIPTION OF THE PREFERRED EMBODIMENTS

Hereinbelow, embodiments will be described with reference to the drawings.

First Embodiment

Figure 1:
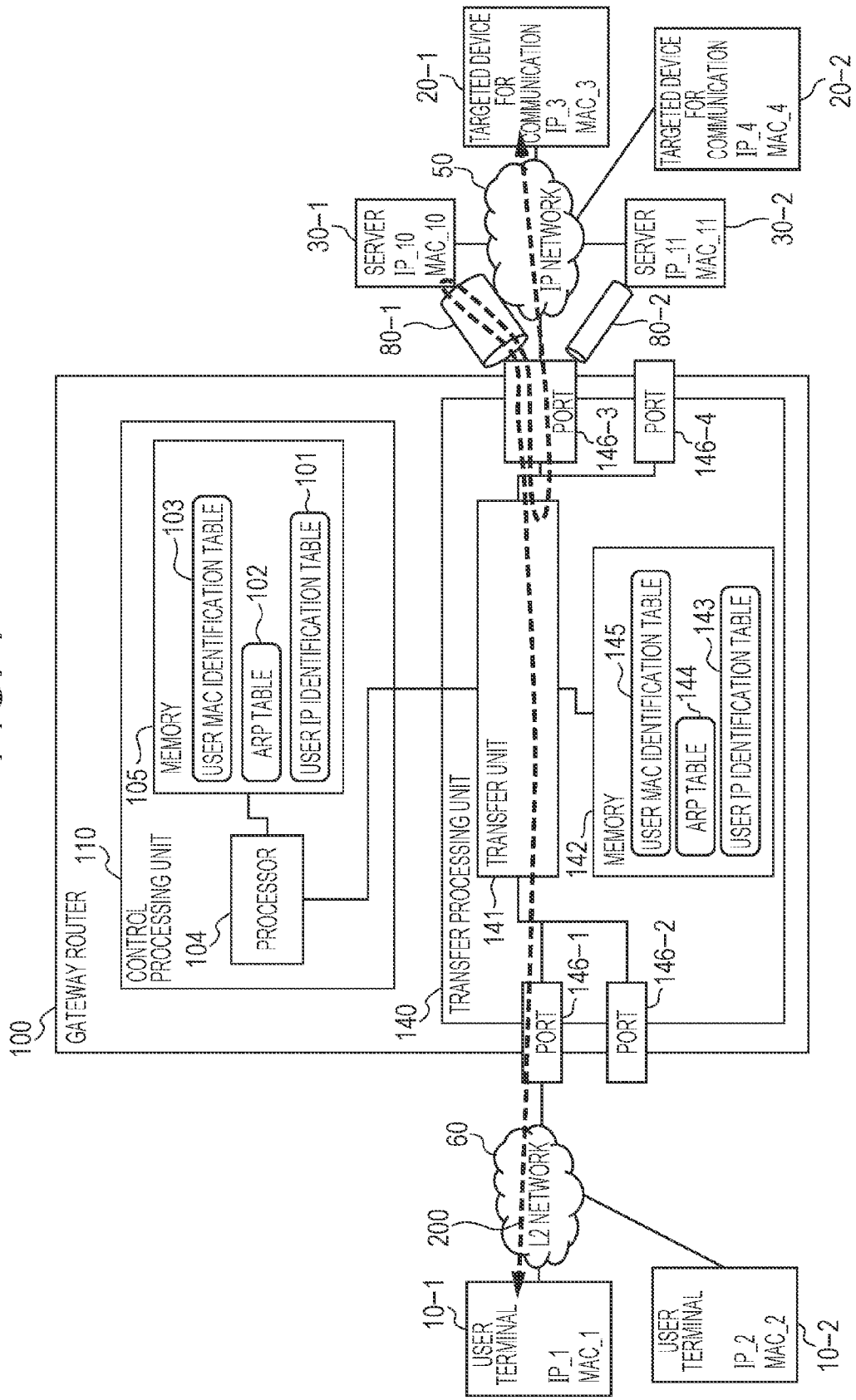
FIG. 1 is an example of a configuration diagram of a whole network.

FIG. 1 is an example of a configuration diagram of a whole network.

A gateway router 100 is a transfer device (communication device) connected to an IP network 50 of a layer 3 network (hereinafter referred to as "L3 network"), which is a network side, and a layer 2 network (hereinafter referred to as "L2 network") 60, which is a user side. The gateway router 100 transfers (relays) data (hereinafter also referred to as "traffic") addressed to the IP network 50 or the L2 network 60. The followings are connected to the IP network 50: a server 30-1 (IP address: IP_10, MAC address: MAC_10), a server 30-2 (IP address: IP_11, MAC address: MAC_11), a targeted device for communication 20-1 (IP address: IP_3, MAC address: MAC_3), and a targeted device for communication 20-2 (IP address: IP_4, MAC address: MAC_4).

The followings are connected to the L2 network 60: a user terminal 10-1 (IP address: IP_1, MAC address: MAC_1), and a user terminal 10-2 (IP address: IP_2, MAC address: MAC_2). When making no distinction between the user terminal 10-1 and the user terminal 10-2 in the following description, the user terminals 10-1 and 10-2 are described as the user terminal 10. The same holds for the server 30, the targeted device for communication 20, and the like.

The user terminal 10 transmits data to and receives data from the targeted device for communication 20 through the gateway router 100. The server 30 executes processing such as inspection, monitoring, or analysis, to data received by the server 30. The processing executed by the server 30 is not limited to inspection, monitoring, or analysis, and any processing may be executed as long as the processing is executed to the received data.

The gateway router 100 establishes a tunnel 80-1 and a tunnel 80-2 with the server 30-1 and the server 30-2, respectively. For example, among data received from the user terminal 10-1 or the user terminal 10-2 and addressed to the targeted device for communication 20-1 or the targeted device for communication 20-2, the gateway router 100 encapsulates data 200 of the user terminal 10-1 addressed to the targeted device for communication 20-1, which data is to be detoured, and transmits the data to the server 30-1 through the tunnel 80-1. A tunnel identifier which uniquely indicates a tunnel is assigned to the tunnel 80. The tunnel identifier may be a server identifier which uniquely indicates the server 30.

In the following description, a packet is used as a specific format of data. However, a frame may be used. An actual network may include, respective pluralities of gateway routers, L2 networks, user terminals, servers, tunnels, and targeted devices for communication. In addition, the embodiment may be applied to a mobile network. In that case, for example, the user terminal 10 corresponds to a mobile phone terminal, and the server 30 corresponds to various servers which set priority control or charging rules in accordance with services in the mobile network, and the gateway router 100 corresponds to a gateway device connected to between the mobile phone terminal and the various servers.

The gateway router 100 includes a control processing unit 110 and a transfer processing unit 140. The control processing unit 110 is a function unit which includes a processor 104 and a memory 105, generates information necessary for transferring a packet, and transmits the information to the transfer processing unit 140, thereby controlling an operation of the transfer processing unit 140. The processor 104 realizes a function of the control processing unit 110 by executing (processing) a program (not illustrated) stored in the memory 105. The memory 105 stores (retains), as information necessary for transferring a packet, a user IP identification table 101, an address resolution protocol (ARP) table 102, and a user MAC identification table 103.

The user IP identification table 101 stores information regarding a correspondence relation between an IP address and information of processing to traffic which the gateway router 100 transmits/receives (traffic processing information). The traffic processing information is destination information (server-associated information) in relation (association) with the server 30 in the IP network 50 which is a destination of the traffic which the gateway router 100 transmits (transfers). The ARP table 102 stores information regarding a correspondence relation between the IP address and the MAC address. The user MAC identification table 103 stores information regarding a correspondence relation between the MAC address and the traffic processing information.

The user IP identification table 101 is IP address destination information (IP address data processing information, IP address-server correspondence information). The ARP table 102 is address information. The user MAC identification table 103 is MAC address destination information (MAC address data processing information, MAC address-server correspondence information). The user IP identification table 101 is created based on the ARP table 102 and the user MAC identification table 103.

The transfer processing unit 140 is a function unit which includes a plurality of ports 146-1 to 146-4, a transfer unit 141, and a memory 142 and transfers a packet received through the port 146 to a destination of the packet (the control processing unit 110, the L2 network 60, or the IP network 50). The plurality of ports 146-1 to 146-4 is connected to the L2 network 60 or the IP network 50, and transmits/receives the packet. The gateway router 100 manages port-network correspondence information (correspondence relation between a port identifier which uniquely indicates the port 146 and a network identifier which uniquely indicates a network) (not illustrated). The port-network correspondence information is information indicating whether each of the ports 146 belongs to a network side (IP network 50) or a user side (L2 network 60). The gateway router 100 specifies a source (IP network 50 or L2 network 60) of the packet based on the port 146 which has received the packet. In the embodiment, the port 146 may be a physical port or may be a logical port. The port 146 may be called an interface 146.

The gateway router 100 manages port-tunnel correspondence information (correspondence relation between a port identifier and a tunnel identifier) (not illustrated). The port-tunnel correspondence information is information indicating that, regarding each of the ports 146, which port belongs to which tunnel (which port is connected to which tunnel).

The transfer unit 141 refers to the memory 142 to search for a destination of the packet received through the port 146. In accordance with a result of the search, the transfer unit 141 updates information (header information) stored in a header portion of the packet, and transfers the packet through the port 146. Here, the header information is control information to which each device refers when transmitting/receiving the packet, and includes an IP address and a MAC address. In addition, the transfer unit 141 updates the header information of the packet including encapsulation and decapsulation, as needed, when transferring the packet.

The memory 142 stores a user IP identification table 143, an ARP table 144, and a user MAC identification table 145, as information necessary for transferring a packet.

Each of the control processing unit 110 and the transfer processing unit 140 is connected through an internal port (not illustrated).

The transfer unit 141 and the memory 142 may be realized as a hardware by using an integrated circuit such as a field-programmable gate array (FPGA) to design the transfer unit 141 and the memory 142. In addition, each function may be realized by the transfer unit 141 being a processor and executing a program (not illustrated) stored in the memory 142. In that case, the processing executed by the transfer unit 141 in the following description is executed actually by the processor corresponding thereto.

The port 146 may be provided in a network interface unit, which is a function unit different from the transfer processing unit 140. In that case, the transfer processing unit 140 transfers a packet received from the L2 network 60 or the IP network 50 through the network interface unit.

The control processing unit 110 generates and updates the ARP table 102 in accordance with processing of a protocol of the packet transferred from the transfer processing unit 140, or a configuration input from a management device (not illustrated) connected through the port 146. Examples of the processing of a protocol of the packet include processing in which the gateway router 100 exchanges an ARP request and an ARP response with the user terminal 10 or an neighbor router, thereby resolving a MAC address corresponding to an IP address of the user terminal 10 or the neighbor router, and processing in which an unused entry in the ARP table 102 is deleted by timeout. Any processing may be performed as long as it is processing for resolving a MAC address corresponding to an IP address, or processing regarding update of the ARP table 102.

In addition, the control processing unit 110 generates and updates the user MAC identification table 103 in accordance with a configuration input from the management device. Furthermore, the control processing unit 110 generates and updates the user IP identification table 101 based on the ARP table 102 and the user MAC identification table 103. Details of the generation and the update of the user IP identification table 101 will be described later.

The management device may be connected through a port for management (not illustrated) different from the port 146. The port for management may be connected to the control processing unit 110.

The control processing unit 110 includes the ARP table 102 serving as a master, the user MAC identification table 103, and the user IP identification table 101. When updating the content of these tables, the control processing unit 110 notifies the transfer processing unit 140 of the content of the update. The transfer processing unit 140 notified thereof updates the content of each of the ARP table 144, the user MAC identification table 145, and the user IP identification table 143 retained therein in accordance with the content of the notice. As a result, the content of the ARP tables, the user MAC identification tables, and the user IP identification tables retained in the control processing unit 110 and the transfer processing unit 140 becomes identical, respectively.

An overview of an operation in the embodiment will be described using FIG. 1.

First, a packet transmitted by the targeted device for communication 20-1 and addressed to the user terminal 10-1 will be described. When receiving a packet addressed to the user terminal 10-1 in the L2 network 60 through the port 146-3 connected to the IP network 50, the transfer unit 141 of the gateway router 100 searches the ARP table 144 using, as a search key, a destination IP address included in the received packet to acquire a MAC address corresponding to the destination IP address, searches the user MAC identification table 145 using, as a search key, the acquired MAC address, and depending on a result of the search, controls whether to transfer, through the port 146-3, the received packet in accordance with traffic processing information corresponding to the acquired MAC address.

When the user MAC identification table 145 is searched using, as a search key, the MAC address corresponding to the destination IP address included in the received packet, and as a result thereof, there is traffic processing information corresponding to the MAC address in the user MAC identification table 145, the transfer unit 141 acquires the traffic processing information from the user MAC identification table 145, encapsulates the received packet based on the acquired traffic processing information, and transmits the encapsulated packet to the server 30-1 through a port (not illustrated) which belongs to the tunnel 80-1. The port (not illustrated) which belongs to the tunnel 80-1 is connected to the IP network 50.

In addition, when the user MAC identification table 145 is searched using, as a search key, the MAC address corresponding to the destination IP address and as a result thereof, there is no traffic processing information corresponding to the MAC address in the user MAC identification table 145, the transfer unit 141 transmits, in accordance with the MAC address corresponding to the destination IP address, the received packet to the user terminal 10-1 through the port 146-1 connected to the L2 network 60.

Then the packet transmitted to the server 30-1 is looped back at the server 30-1. When receiving the packet looped back through the port (not illustrated) which belongs to the tunnel 80-1, the transfer unit 141 decapsulates the packet, searches the ARP table 144 using, as a search key, a destination IP address included in the packet after decapsulation to acquire a MAC address, and transmits the packet after decapsulation to the user terminal 10-1 through the port 146-1 in accordance with the acquired MAC address.

Next, a packet transmitted by the user terminal 10-1 and addressed to the targeted device for communication 20-1 will be described. When receiving a packet addressed to the targeted device for communication 20-1 in the IP network 50 through the port 146-1, the transfer unit 141 searches the user MAC identification table 145 using, as a search key, a source MAC address included in the received packet, and depending on the search result, controls whether to transfer the received packet through the port 146-3 to the server 30-1 in accordance with traffic processing information corresponding to the source MAC address.

When the user MAC identification table 145 is searched using the source MAC address as a search key, and as a result thereof, there is traffic processing information corresponding to the MAC address in the user MAC identification table 145, the transfer unit 141 acquires the traffic processing information from the user MAC identification table 145, encapsulates the received packet based on the acquired traffic processing information, and transmits the encapsulated packet to the server 30-1 through the port (not illustrated) which belongs to the tunnel 80-1.

Then the packet transmitted to the server 30-1 is looped back at the server 30-1. When receiving the packet looped back through the port (not illustrated) which belongs to the tunnel 80-1, the transfer unit 141 decapsulates the packet, and transmits the packet after decapsulation to the targeted device for communication 20-1 through the port 146-3 in accordance with a destination IP address included in the packet after decapsulation.

In the following description, an example will be described in which the user IP identification table 143 is used for acquiring traffic processing information corresponding to the destination IP address included in the packet transmitted by the targeted device for communication 20-1 and addressed to the user terminal 10-1

The control processing unit 110 and the transfer processing unit 140 may be configured as one card (module), or the control processing unit 110 and the transfer processing unit 140 may be configured as a control card (control module) and a transfer card (transfer module), respectively. As another mode of the device configuration, a configuration may be employed in which the gateway router 100 includes the transfer processing unit 140 only, an external device (not illustrated) including the control processing unit 110 is connected to the gateway router 100, and the external device controls an operation of the gateway router 100.

As still another mode, the gateway router 100 may have a redundant configuration including an active transfer processing unit 140 and a standby transfer processing unit 140. Even in case of failure in an neighbor router, a port, or the active transfer processing unit 140, a packet from the L2 network 60 or the IP network 50 is processed by the standby transfer processing unit 140, and thereby the packet can be continuously transferred.

As still another mode, the gateway router 100 may include a plurality of the transfer processing units 140, and may distribute packets from the L2 network 60 or packets from the IP network 50 over the plurality of the transfer processing units 140 to process the packets.

The processing for receiving a packet with the standby transfer processing unit 140 switched from the active transfer processing unit 140 in case of failure, and the processing for distributing packets over a plurality of the transfer processing units 140 in the redundant configuration can be realized by link aggregation and general protocol processing such as a multipath function of a routing protocol. In the embodiment, modes for carrying out the processing are not particularly limited.

FIG. 3 is an example of a configuration of the ARP table. Although a description will be given using the ARP table 102 of the control processing unit 110 as an example, the same holds for the ARP table 144 of the transfer processing unit 140.

The ARP table 102 retains an entry in which an IP address 40 of a destination of a packet and a MAC address 41 of the destination of the packet are brought into correspondence with each other.

In the example illustrated in FIG. 3, the followings are stored; an entry of the IP address (IP_1) and the MAC address (MAC_1) of the user terminal 10-1, an entry of the IP address (IP_2) and the MAC address (MAC_2) of the user terminal 10-2, an entry of an IP address (IP_A) and a MAC address (MAC_A) of a communication device (not illustrated) (next hop) neighbor to the gateway router 100 through which a packet addressed to the targeted device for communication 20-1 is routed, and an entry of an IP address (IP_B) and a MAC address (MAC_B) of a next hop (not illustrated) through which a packet addressed to the targeted device for communication 20-2 is routed.

The control processing unit 110 searches the ARP table 102 using the IP address 40 as a search key, and acquires the MAC address 41 as an output of a result of the search. The ARP table 102 may retain the IP address 40, a port identifier of the port 146 which is an interface of a destination of a packet, and the MAC address 41, in correspondence to one another. In that case, the control processing unit 110 acquires the MAC address 41 using the IP address 40 and the port identifier as search keys. The ARP table 102 which retains the IP address 40, the port identifier, and the MAC address 41 in correspondence to one another may use two elements of these three elements to search for the rest one element. With the ARP table 102 including the three elements, a flow of a packet can be specified in more detail.

FIG. 4 is an example of a configuration of the user MAC identification table. Although a description will be given using the user MAC identification table 103 of the control processing unit 110 as an example, the same holds for the user MAC identification table 145 of the transfer processing unit 140.

The user MAC identification table 103 retains an entry in which a MAC address 42 of the user terminal 10 for identifying the user terminal 10 and traffic processing information 43 are brought into correspondence with each other. The traffic processing information 43 is destination information used when transmitting a packet to the server 30 in the IP network 50.

The control processing unit 110 searches the user MAC identification table 103 using the MAC address 42 as a search key, and acquires the traffic processing information 43 as an output of a result of the search.

The traffic processing information 43 is information which specifies a server 30 as a detour destination (information regarding the server 30 which does not exist on a communication route between the user terminal 10 and the targeted device for communication 20). The traffic processing information 43 includes, but not limited to, any of the following information or combination thereof: information of a port identifier of the port 146 as an output destination of a packet or a next hop used for policy-based routing (for example, an IP address of the next hop); or information of an added header which is added to a header portion of a packet (for example, an IP in IP header including the IP address of the server 30, a generic tunneling protocol header such as a generic routing encapsulation (GRE) header, a network virtualization using GRE (NVGRE) header, a stateless transport tunneling (STT) header, a virtual extensible local area network (VXLAN) header, and a multi protocol label switching (MPLS) header). For example, the traffic processing information 43 may include information of added headers for a plurality of servers and information of an order of transmission to the plurality of servers, or information of a network service header (NSH).

In the example illustrated in FIG. 4, an entry including the MAC address (MAC_1) of the user terminal 10-1 and information of an added header (TID_1, IP_10) is stored. The information of the added header (TID_1, IP_10) is used for encapsulation of the packet when the packet transmitted/received by the user terminal 10-1 is routed through the tunnel 80-1. The information of the added header (TID_1, IP_10) is "TID_1" and "IP_10". "TID_1" is a tunnel identifier of the tunnel 80-1, and "IP_10" is an IP address of the server 30-1 which is a destination of the encapsulated packet. In a case where the traffic processing information 43 is information of an added header and there is no need to identify a tunnel, at least a server identifier indicating the server 30 (such as the IP address of the server 30) may be included. The gateway router 100 may appropriately acquire information to be stored in the added header upon encapsulation excluding the traffic processing information 43 in an autonomous manner.

The user MAC identification table 103 may retain the MAC address 42, the port identifier, and the traffic processing information 43 in correspondence to one another. In that case, the control processing unit 110 acquires the traffic processing information 43 using the MAC address 42 and the port identifier as search keys. The user MAC identification table 103 which retains the MAC address 42, the port identifier, and the traffic processing information 43 in correspondence to on another may use two elements of these three elements to search for the rest one element. With the user MAC identification table 103 including the three elements, a flow of a packet can be specified in more detail.

FIG. 5 is an example of a configuration of the user IP identification table. Although a description will be given using the user IP identification table 101 of the control processing unit 110 as an example, the same holds for the user IP identification table 143 of the transfer processing unit 140.

The user IP identification table 101 retains an entry in which an IP address 44 and traffic processing information 45 are brought into correspondence with each other. The entry of the user IP identification table 101 is a set of an IP address and traffic processing information. The IP address is acquired from the IP address 40 which is a search key for the ARP table 102. The traffic processing information is acquired from the traffic processing information 43 which is an output of the user MAC identification table 103.

In other words, regarding the IP address 44 of the user IP identification table 101 and the IP address 40 of the ARP table 102, the same IP address is stored, and regarding the traffic processing information 45 of the user IP identification table 101 and the traffic processing information 43 of the user MAC identification table 103, the same traffic processing information is stored.

In the example illustrated in FIG. 5, an entry including the IP address (IP_1) of the user terminal 10-1 and information of an added header (TID_1, IP_10) is stored. The information of the added header (TID_1, IP_10) is information used for encapsulation when the packet is routed through the tunnel 80-1.

The control processing unit 110 searches the user IP identification table 101 using the IP address 44 as a search key, and acquires the traffic processing information 45 as an output of a result of the search.

Figure 6:
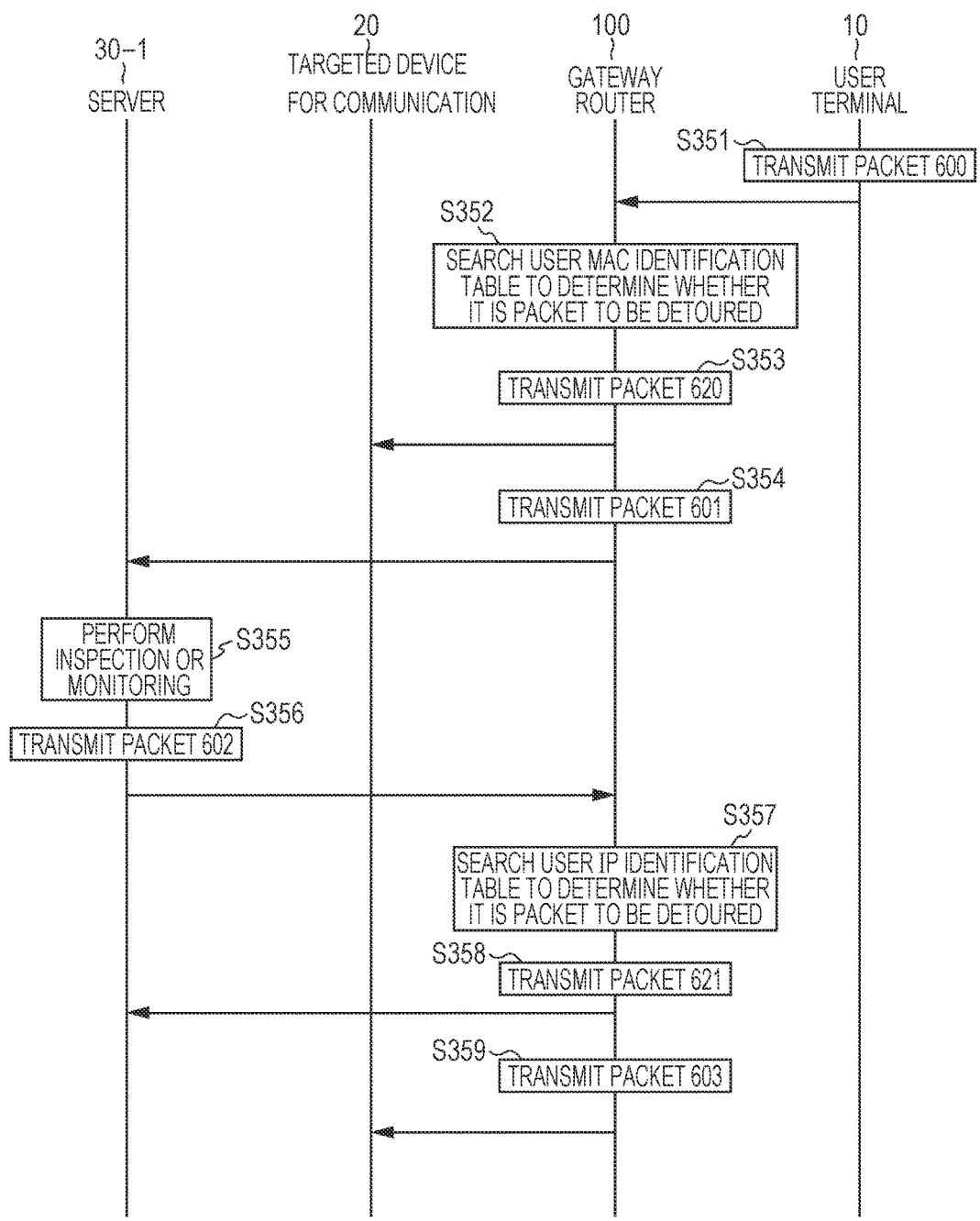
FIG. 6 is an example of a sequence of processing in which a gateway router of a first embodiment detours a packet, which has been transmitted to a targeted device for communication from a user terminal, to a server.

FIG. 6 illustrates an example of a sequence of transfer processing performed when the gateway router in the first embodiment has received a packet transmitted from the user terminal to the targeted device for communication.

First, the user terminal 10 transmits a packet 600 to the targeted device for communication 20 (S351). The packet 600 includes header information of a source IP address: an IP address of the user terminal 10, a destination IP address: an IP address of the targeted device for communication 20, a source MAC address: a MAC address of the user terminal 10, and a destination MAC address: a MAC address of the port 146-1.

When receiving the packet 600 from the L2 network 60, the gateway router 100 searches the user MAC identification table 145 to determine (identify or specify) whether the packet is a packet to be detoured to the server 30 (S352).

In a case where the packet 600 is not a packet to be detoured, the gateway router 100 searches a routing table (not illustrated) which retains packet routing information, and transmits a packet 620 in which header information has been updated to the targeted device for communication 20 (S353). The packet routing information is a correspondence relation among the destination IP address, an IP address of an neighbor router (next hop) through which a packet is transmitted to the destination IP address, and a port identifier of a port connected to the next hop.

In a case where the packet 600 is a packet to be detoured, the gateway router 100 uses the traffic processing information 43 to provide an added header to the packet 600 for encapsulation, searches the routing table, and transmits an encapsulated packet 601 to the server 30-1 corresponding to the traffic processing information 43 (S354).

A payload unit (data unit) of the encapsulated packet 601 is the packet 600, and a header portion (added header added to the packet 600) of the packet 601 includes traffic processing information (information of the added header). In other words, the packet 601 includes header information of a tunnel identifier: a tunnel identifier of the tunnel 80-1, a source IP address: an IP address of a port (not illustrated) which belongs to the tunnel 80-1, a destination IP address: an IP address of the server 30-1, a source MAC address: a MAC address of the port (not illustrated) which belongs to the tunnel 80-1, a destination MAC address: a MAC address of a communication device (not illustrated) (next hop) neighbor to the gateway router 100 through which the packet 601 addressed to the server 30-1 is routed.

The server 30-1 performs processing such as inspection or monitoring to the packet 601 received from the gateway router 100 (S355), and transmits a packet 602 to the gateway router 100 (S356).

When receiving the packet 602 from the server 30-1, the gateway router 100 performs decapsulation (removal of the added header) of the packet 602, and searches the user IP identification table 143 to determine whether the decapsulated packet is a packet to be detoured to the server 30 (S357).

In the packet 602 before decapsulation received by the gateway router 100, header information has been updated by a communication device (not illustrated) located between the server 30-1 and the gateway router 100. The packet 602 includes header information of a tunnel identifier: a tunnel identifier of the tunnel 80-1, a source IP address: an IP address of the server 30-1, a destination IP address: an IP address of a port (not illustrated) which belongs to the tunnel 80-1, a source MAC address: a MAC address of a communication device (not illustrated) (next hop) neighbor to the gateway router 100 through which the packet 602 addressed to the port (not illustrated) which belongs to the tunnel 80-1 is routed, and a destination MAC address: a MAC address of the port (not illustrated) which belongs to the tunnel 80-1.

In a case where the decapsulated packet is a packet to be detoured, the gateway router 100 transmits, in accordance with the routing table, a packet 621 which has been encapsulated using the traffic processing information 45 to the server 30-1 corresponding to the traffic processing information 45 (S358). In a case where the decapsulated packet is not a packet to be detoured, the gateway router 100 searches the routing table to transmit a packet 603 to the targeted device for communication 20 (S359).

The packet 603 includes header information of a source IP address: an IP address of the user terminal 10, a destination IP address: an IP address of the targeted device for communication 20, a source MAC address: a MAC address of the port 146-3, and a destination MAC address: a MAC address of a communication device (not illustrated) (next hop) neighbor to the gateway router 100 through which the packet 603 addressed to the targeted device for communication 20 is routed.

Figure 7:
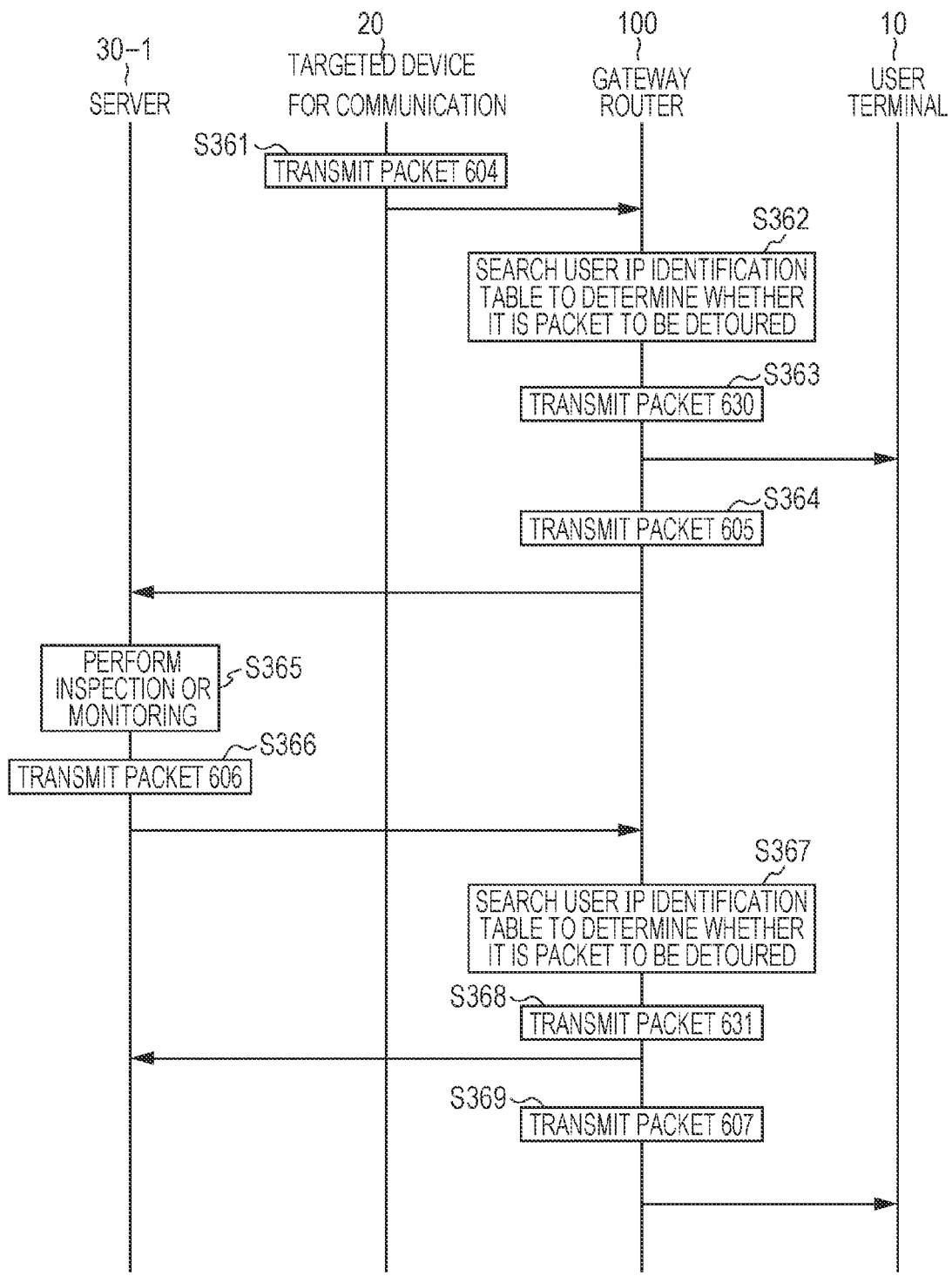
FIG. 7 is an example of a sequence of processing in which the gateway router of the first embodiment detours a packet, which has been transmitted to the user terminal from the targeted device for communication, to the server.

FIG. 7 illustrates an example of a sequence of transfer processing performed when the gateway router in the first embodiment has received a packet transmitted from the targeted device for communication to the user terminal.

First, the targeted device for communication 20 transmits a packet 604 to the user terminal 10 (S361). The packet 604 received by the gateway router 100 includes header information of a source IP address: an IP address of the targeted device for communication 20, a destination IP address: an IP address of the user terminal 10, a source MAC address: a MAC address of a communication device (not illustrated) (next hop) neighbor to the gateway router 100 through which the packet 604 addressed to the port 146-3 is routed, and a destination MAC address: a MAC address of the port 146-3.

When receiving the packet 604 from the IP network 50, the gateway router 100 searches the user IP identification table 143 to determine whether the packet is a packet to be detoured to the server 30 (S362). In a case where the packet 604 is not a packet to be detoured, the gateway router 100 searches a routing table, and transmits a packet 630 in which header information has been updated to the user terminal 10 (S363). In a case where the packet 604 is a packet to be detoured, the gateway router 100 uses the traffic processing information 45 to provide an added header to the packet 604 for encapsulation, searches the routing table, and transmits an encapsulated packet 605 to the server 30-1 corresponding to the traffic processing information 45 (S364).

The packet 605 includes header information of a tunnel identifier: a tunnel identifier of the tunnel 80-1, a source IP address: an IP address of a port (not illustrated) which belongs to the tunnel 80-1, a destination IP address: an IP address of the server 30-1, a source MAC address: a MAC address of the port (not illustrated) which belongs to the tunnel 80-1, a destination MAC address: a MAC address of a communication device (not illustrated) (next hop) neighbor to the gateway router 100 through which the packet 605 addressed to the server 30-1 is routed.

The server 30-1 performs processing such as inspection or monitoring to the packet 605 received from the gateway router 100 (S365), and transmits a packet 606 to the gateway router 100 (S366).

When receiving the packet 606 from the server 30-1, the gateway router 100 decapsulates the packet 606, and searches the user IP identification table 143 to determine whether the decapsulated packet is a packet to be detoured to the server 30 (S367). In the packet 606 before decapsulation received by the gateway router 100, header information has been updated by a communication device (not illustrated) located between the server 30-1 and the gateway router 100. The packet 606 includes header information of a source IP address: an IP address of the server 30-1, a destination IP address: an IP address of a port (not illustrated) to which the tunnel 80-1 belongs, a source MAC address: a MAC address of a communication device (not illustrated) (next hop) neighbor to the gateway router 100 through which the packet 606 addressed to the port (not illustrated) to which the tunnel 80-1 belongs is routed, and a destination MAC address: a MAC address of the port (not illustrated) to which the tunnel 80-1 belongs.

In a case where the decapsulated packet is a packet to be detoured, the gateway router 100 transmits, in accordance with the routing table, a packet 631 which has been encapsulated using the traffic processing information 45 to the server 30-1 corresponding to the traffic processing information 45 (S368). In a case where the decapsulated packet is not a packet to be detoured, the gateway router 100 searches the routing table to transmit a packet 607 to the user terminal 10 (S369).

The packet 607 includes header information of a source IP address: an IP address of the targeted device for communication 20, a destination IP address: an IP address of the user terminal 10, a source MAC address: a MAC address of the port 146-1, and a destination MAC address: a MAC address of the user terminal 10.

Figure 2:
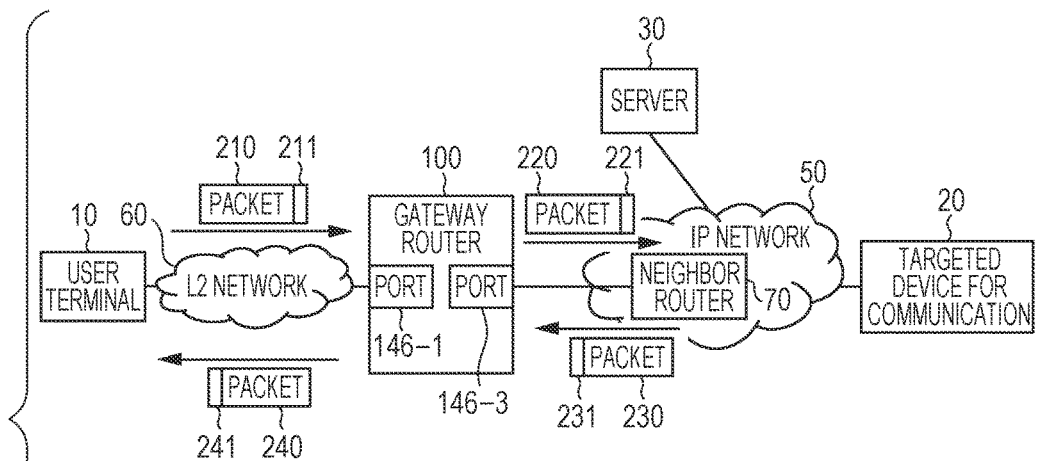
FIG. 2 is a diagram for explaining a configuration example of a packet transmitted and received by a gateway router.

FIG. 2 is a diagram for explaining a configuration example of a packet transmitted and received by the gateway router 100.

In FIG. 2, the gateway router 100 is connected to an neighbor router 70 in the IP network 50, and relays traffic (packets 210, 220, 230, and 240) communicated between the user terminal 10 and the targeted device for communication 20 through the neighbor router 70. Header information 211, 221, 231, and 241 are included in the packets 210, 220, 230, and 240, respectively.

When received by the gateway router 100, the header information 211 of the packet 210 transmitted by the user terminal 10 to the targeted device for communication 20 is configured to include an IP address of the targeted device for communication 20 as a destination IP address, an IP address of the user terminal 10 as a source IP address, a MAC address of the port 146-1 as a destination MAC address, and a MAC address of the user terminal 10 as a source MAC address.

When relaying a packet 210 transmitted by the user terminal 10 to the targeted device for communication 20, the gateway router 100 rewrites, in the header information, the source MAC address to the MAC address of the port 146-3, and the destination MAC address to the MAC address of the neighbor router 70, and transmits a packet 220 including header information 221 to the neighbor router 70.

In the packet transmitted by the targeted device for communication 20 to the user terminal 10, the source MAC address and the destination MAC address in the header information are rewritten in the neighbor router 70. The header information 231 of the packet 230 received by the gateway router 100 from the targeted device for communication 20 through the neighbor router 70 is configured to include, in the header information, an IP address of the user terminal 10 as a destination IP address, an IP address of the targeted device for communication 20 as a source IP address, a MAC address of the port 146-3 as a destination MAC address, and a MAC address of the neighbor router 70 as a source MAC address.

When relaying a packet 230 transmitted by the targeted device for communication 20 to the user terminal 10, the gateway router 100 rewrites, in the header information, the source MAC address to the MAC address of the port 146-1, and the destination MAC address to the MAC address of the user terminal 10, and transmits a packet 240 including the header information 241 to the user terminal 10.

As illustrated by a dotted line portion 232 in FIG. 2, when the gateway router 100 receives the packet 230 transmitted by the targeted device for communication 20 to the user terminal 10, the MAC address of the user terminal 10 is not included in the destination MAC address and the source MAC address in the header information 231. Therefore, traffic from the targeted device for communication 20 to the user terminal 10 cannot be specified (identified) using the MAC address of the user terminal 10.

However, when receiving the packet 230, the gateway router 100 of the embodiment searches the user IP identification table 101 generated based on the MAC address of the user terminal 10 using the destination IP address in the header information 231 as a search key, and acquires traffic processing information 45 corresponding to the MAC address of the user terminal 10 indicated by the destination IP address in the header information 231. Consequently, the gateway router 100 can specify (identify) the traffic from the targeted device for communication 20 to the user terminal 10 to be detoured to the server 30.

As described above, the MAC address of the user terminal 10 is not included in the packet which the gateway router 100 receives from the targeted device for communication 20 through the IP network 50. Therefore, the gateway router 100 specifies (identifies) the traffic to be detoured to the server 30 using the destination IP address included in the received packet.

Figure 12A:
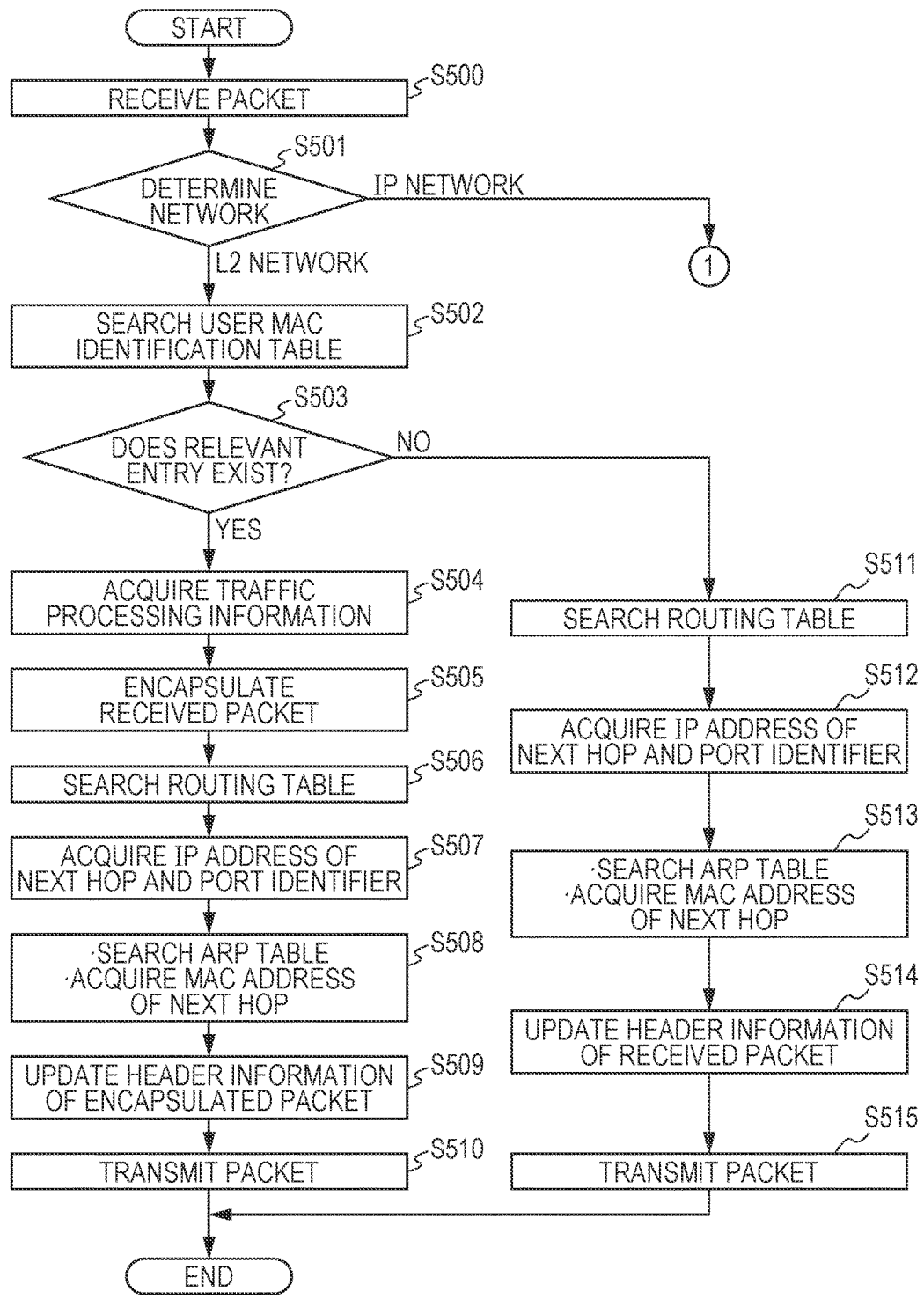
FIG. 12A is an example of a flowchart of packet transfer processing executed by a transfer unit.
Figure 12B:
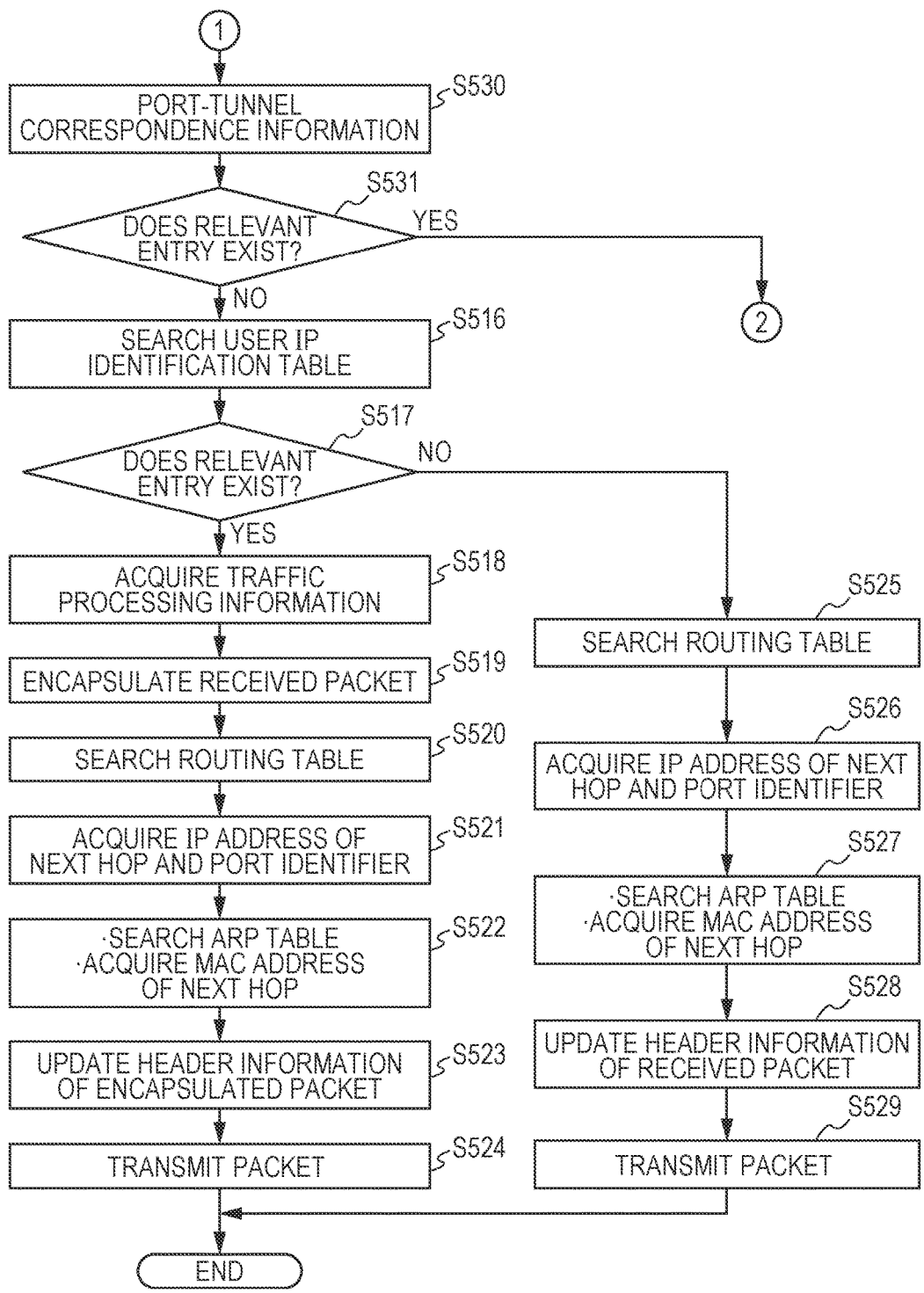
FIG. 12B is an example of a flowchart of packet transfer processing executed by the transfer unit.
Figure 12C:
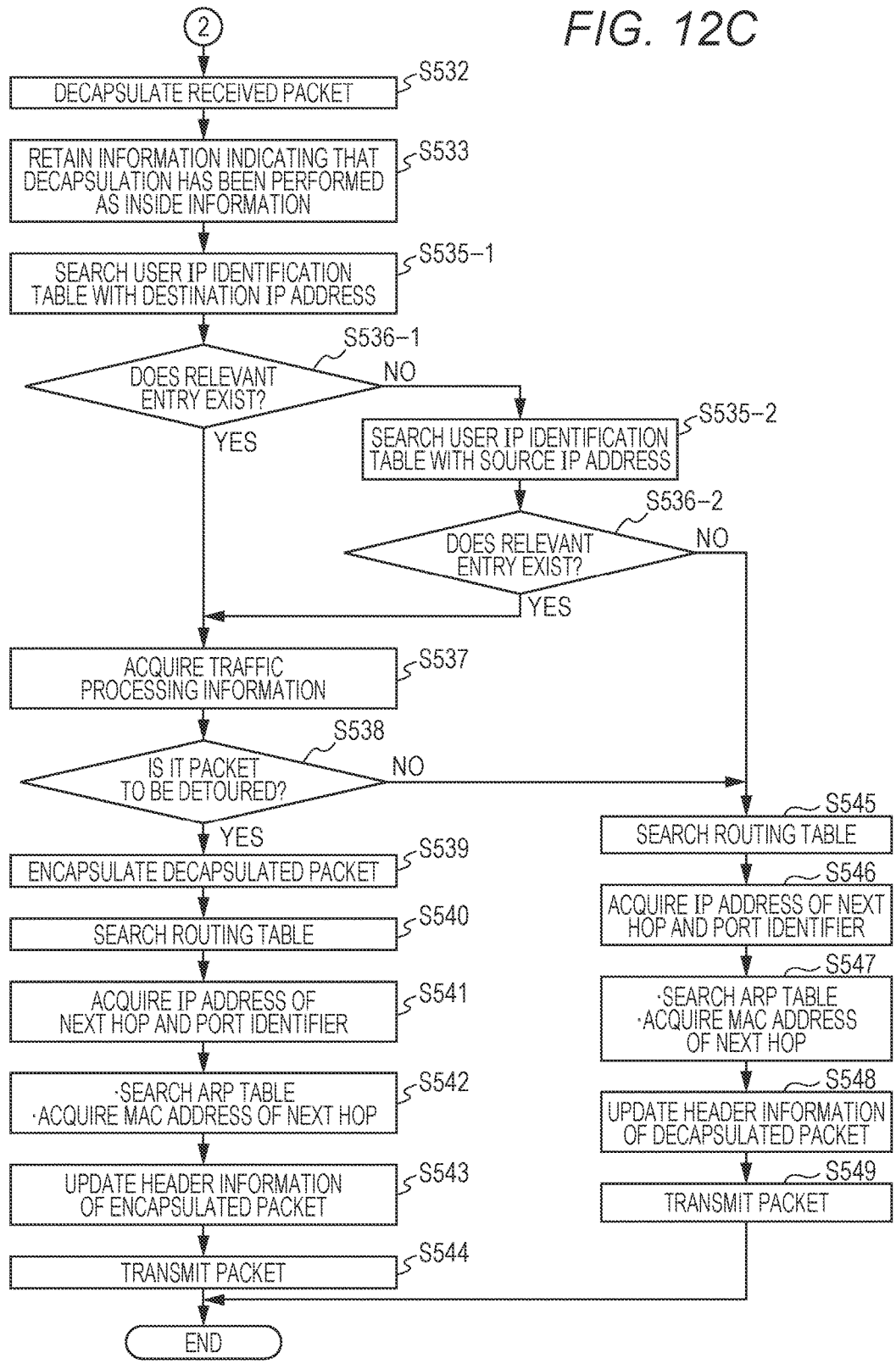
FIG. 12C is an example of a flowchart of packet transfer processing executed by the transfer unit.

Each of FIGS. 12A, 12B, and 12C is an example of a flowchart of packet transfer processing executed by a transfer unit.

When receiving a packet through any port 146 (S500), the transfer unit 141 determines a network to which the port 146, which has received the packet, belongs (S501). Specifically, the transfer unit 141 refers to the port-network correspondence information, specifies a network identifier of the port-network correspondence information corresponding to a port identifier of the port 146 which has received the packet, thereby determining a network (S501).

In a case where the port 146, which has received the packet, has been determined to belong to the L2 network 60, the transfer unit 141 refers to the user MAC identification table 145 to determine (identify) whether the packet is a packet to be detoured to the server 30 (S502, S503). Specifically, the transfer unit 141 searches the MAC address 42 of the user MAC identification table 145 using, as a search key, a source MAC address included in header information of the received packet (S502), and determines whether a relevant entry exists (is hit) (S503).

When the relevant entry exists, the transfer unit 141 acquires the traffic processing information 43 of the relevant entry (S504), and encapsulates the received packet using the acquired traffic processing information 43 (S505). The transfer unit 141 searches the routing table based on header information of the encapsulated packet (S506), and acquires an IP address of a next hop corresponding to a destination IP address included in the header information of the encapsulated packet and a port identifier (S507). Regarding the routing table, as with the case of other tables, the control processing unit 110 retains the routing table serving as a master, and notifies the transfer processing unit 140 of the content of the update of the table. Consequently, the content of the routing table retained in the control processing unit 110 and that of the routing table retained in the transfer processing unit 140 become identical.

The transfer unit 141 searches the ARP table 144 using, as a search key, the IP address of the next hop acquired in step S507 to acquire a MAC address of the next hop (S508), and updates the header information of the encapsulated packet by rewriting a destination MAC address and a source MAC address included in the header information of the encapsulated packet to the acquired MAC address and the MAC address of the port 146 indicated by the port identifier acquired in step S507, respectively (S509). Then, the transfer unit 141 transmits, through the port 146 indicated by the port identifier acquired in step S507, the packet in which the header information has been updated (S510), and terminates the transfer processing of the packet. A destination of the packet transmitted in step S510 is the server 30 corresponding to the traffic processing information 43.

When the relevant entry does not exist in step S503, the transfer unit 141 searches the routing table based on the header information of the received packet (S511), and performs transmission to the targeted device for communication 20 in accordance with routing processing. Specifically, the transfer unit 141 acquires an IP address of a next hop corresponding to a destination IP address included in the header information of the received packet and a port identifier (S512), searches the ARP table 144 using, as a search key, the acquired IP address of the next hop to acquire a MAC address of the next hop (S513), updates the header information of the received packet by rewriting a destination MAC address and a source MAC address included in the header information of the received packet to the acquired MAC address and the MAC address of the port 146 indicated by the port identifier acquired in step S512, respectively (S514), and transmits, through the port 146 indicated by the port identifier acquired in step S512, the packet in which the header information has been updated (S515). A destination of the packet transmitted in step S515 is the targeted device for communication 20 corresponding to the destination IP address included in the header information of the received packet.

In a case where the port 146, which has received the packet, has been determined to belong to the IP network 50 in step S501, the transfer unit 141 determines (identifies) whether the received packet is a packet received from the server 30 (S530, S531). Specifically, the transfer unit 141 refers to the port-tunnel correspondence information to search for a port identifier of the port-tunnel correspondence information corresponding to a port identifier of the port 146 which has received the packet (S530), and determines whether a relevant entry exists (is hit) (S531).

A method for determining (identifying) whether the received packet is a packet received from the server 30 is not limited to the search of the port-tunnel correspondence information. For example, it may be determined whether the source IP address included in the header information of the received packet is the IP address of the server 30, it may be determined whether the destination IP address included in the header information is the IP address of the port 146 indicated by the port identifier of the port 146, which has received the packet, and it may be determined whether the tunnel identifier is included in the header information. There is no limitation for the method as long as it is possible to determine with the method whether the received packet is a packet received from the server 30, or a packet received from the targeted device for communication 20.

When the relevant entry does not exist, in other words, the received packet is not a packet received from the server 30, the transfer unit 141 refers to the user IP identification table 143 to determine (identify) whether the packet is a packet to be detoured to the server 30 (S516, S517). Specifically, the transfer unit 141 searches the IP address 44 of the user IP identification table 143 using, as a search key, the destination IP address included in the header information of the received packet (S516), and determines whether a relevant entry exists (is hit) (S517).

When the relevant entry exists, the transfer unit 141 acquires the traffic processing information 45 of the relevant entry (S518), and encapsulates the received packet using the acquired traffic processing information 45 (S519). The transfer unit 141 searches the routing table based on header information of the encapsulated packet (S520), and acquires an IP address of a next hop corresponding to a destination IP address included in the header information of the encapsulated packet and a port identifier (S521).

The transfer unit 141 searches the ARP table 144 using, as a search key, the IP address of the next hop acquired in step S521 to acquire a MAC address of the next hop (S522), and updates the header information of the encapsulated packet by rewriting a destination MAC address and a source MAC address included in the header information of the encapsulated packet to the acquired MAC address and the MAC address of the port 146 indicated by the port identifier acquired in step S521, respectively (S523). Then, the transfer unit 141 transmits, through the port 146 indicated by the port identifier acquired in step S521, the packet in which the header information has been updated (S524), and terminates the transfer processing of the packet. A destination of the packet transmitted in step S524 is the server 30 corresponding to the traffic processing information 45.

When the relevant entry does not exist in step S517, the transfer unit 141 searches the routing table based on the header information of the received packet (S525), and performs transmission to the user terminal 10 in accordance with routing processing. Specifically, the transfer unit 141 acquires an IP address of a next hop corresponding to a destination IP address included in the header information of the received packet and a port identifier (S526), searches the ARP table 144 using, as a search key, the acquired IP address of the next hop to acquire a MAC address of the next hop (S527), updates the header information of the received packet by rewriting a destination MAC address included in the header information of the received packet to the acquired MAC address and rewriting a source MAC address included in the header information of the received packet to the MAC address of the port 146 indicated by the port identifier acquired in step S526 (S528), and transmits, through the port 146 indicated by the port identifier acquired in step S526, the packet in which the header information has been updated (S529). A destination of the packet transmitted in step S529 is the user terminal 10 corresponding to the destination IP address included in the header information of the received packet.

When the relevant entry exists in step S531, in other words, the received packet is a packet received from the server 30, the transfer unit 141 performs decapsulation (removal, deletion of the added header) of the received packet (S532). The transfer unit 141 retains, as inside information, information indicating that the transfer unit 141 has decapsulated the packet received from the server 30 (S533). The transfer unit 141 determines whether the packet after decapsulation is a packet transmitted from the server 30 based on a processing result indicating that it is a decapsulated packet. The transfer unit 141 retains, as inside information, the processing result as a flag or additional data. Regarding a mode for determining whether the packet after decapsulation is a packet transmitted from the server 30, there is no limitation to the above example, and the destination IP address and the source IP address included in the header information, and information of an order of transmission in the server included in a layer 7 may be used.

The transfer unit 141 searches the user IP identification table 143 using, as a search key, the destination IP address of the decapsulated packet to acquire the traffic processing information 45, and refers to the acquired traffic processing information 45 and the retained inside information to determine (identify) whether the decapsulated packet is a packet to be detoured to the server 30 (S535 to S538).

Specifically, the transfer unit 141 searches the IP address 44 of the user IP identification table 143 using, as a search key, the destination IP address included in header information of the decapsulated packet (S535-1), and determines whether a relevant entry exists (is hit) (S536-1). When the relevant entry does not exist, the transfer unit 141 searches the IP address 44 of the user IP identification table 143 again using, as a search key, the source IP address (S535-2), and determines whether a relevant entry exists (is hit) (S536-2).

When the relevant entry exists in either of step S536-1 or step S536-2, the transfer unit 141 acquires the traffic processing information 45 of the relevant entry (S537), and uses the acquired traffic processing information 45 and the inside information to determine whether the decapsulated packet is a packet to be detoured to the server 30 (S538). Regarding a mode for determining whether the packet is a packet to be detoured to any of the servers 30, there is no limitation to the above example, and information of an added header and information of an order of transmission in the server 30 included in the traffic processing information 45, the header information of the received packet, information of 5-tuple of the decapsulated packet, and information of an order of transmission in the server 30 included in the layer 7 may be used.

When the packet is a packet to be detoured, the transfer unit 141 encapsulates the decapsulated packet using the traffic processing information 45 (S539), searches the routing table based on header information of the encapsulated packet (S540), and acquires an IP address of a next hop corresponding to a destination IP address included in the header information of the encapsulated packet and a port identifier (S541).

The transfer unit 141 searches the ARP table 144 using, as a search key, the IP address of the next hop acquired in step S541 to acquire a MAC address of the next hop (S542), and updates the header information of the encapsulated packet by rewriting a destination MAC address and a source MAC address included in the header information of the encapsulated packet to the acquired MAC address and the MAC address of the port 146 indicated by the port identifier acquired in step S541, respectively (S543). Then, the transfer unit 141 transmits, through the port 146 indicated by the port identifier acquired in step S541, the packet in which the header information has been updated (S544), and terminates the transfer processing of the packet. A destination of the packet transmitted in step S544 is the server 30 corresponding to the traffic processing information 45.

When the relevant entry does not exist in both of step S536-1 and step S536-2, or when the packet is not a packet to be detoured in step S538, the transfer unit 141 searches the routing table based on the header information of the decapsulated packet (S545), and performs transmission to the user terminal 10 or the targeted device for communication 20 in accordance with routing processing. Specifically, the transfer unit 141 acquires an IP address of a next hop corresponding to a destination IP address included in the header information of the decapsulated packet and a port identifier (S546), searches the ARP table 144 using, as a search key, the acquired IP address of the next hop to acquire a MAC address of the next hop (S547), updates the header information of the decapsulated packet by rewriting a destination MAC address and a source MAC address included in the header information of the decapsulated packet to the acquired MAC address and the MAC address of the port 146 indicated by the port identifier acquired in step S546, respectively (S548), and transmits, through the port 146 indicated by the port identifier acquired in step S546, the packet in which the header information has been updated (S549). A destination of the packet transmitted in step S549 is the user terminal 10 or the targeted device for communication 20 corresponding to the destination IP address included in the header information of the decapsulated packet.

Here, in a case where the user IP identification table 143 is not used to acquire the traffic processing information corresponding to the destination IP address included in the packet transmitted by the targeted device for communication 20 and addressed to the user terminal 10, the transfer unit 141 performs the following processing instead of steps S516 to S517 and steps S535 to S536. The transfer unit 141 searches the IP address 40 of the ARP table 144 using, as a search key, the destination IP address included in the header information of the received packet to acquire the MAC address 41 corresponding to the destination IP address. Then, the transfer unit 141 searches the MAC address 42 of the user MAC identification table 145 using the acquired MAC address as a search key, and determines whether a relevant entry exists (is hit). When the relevant entry exists, the transfer unit 141 acquires the traffic processing information 43 of the relevant entry. The transfer unit 141 uses the acquired traffic processing information 43 to execute each of processing in step S519 and steps subsequent thereto and processing in step S538 and steps subsequent thereto.

By the procedures described above, it is possible for a gateway router to use a MAC address of a user terminal to detour traffic to a server, and thereby it is possible to identify the user terminal without re-inputting a configuration even when an IP address of the user terminal is changed. Consequently, a processing load on the gateway router can be reduced.

Next, details of generation and update of the user IP identification tables 101 and 143 will be described. The control processing unit 110 updates (adds or deletes) an entry of the user IP identification table 101 in response to update (addition or deletion) of an entry of the ARP table 102 or update (addition or deletion) of an entry of the user MAC identification table 103, each of which is serving as a trigger. Hereinbelow, processing for updating an entry in the user IP identification tables 101 and 143 in response to each trigger will be described.

A description will be given for a flow of processing for adding an entry to the user IP identification tables 101 and 143 triggered by addition of an entry to the ARP table 102.

When adding an entry to the ARP table 102 in accordance with processing of a protocol of a packet received through the transfer processing unit 140, or a configuration input through the transfer processing unit 140, the control processing unit 110 temporarily retains, in the memory 105, an IP address and a MAC address used for adding the entry to the ARP table 102. Next, the control processing unit 110 searches the MAC address 42 of the user MAC identification table 103 using the retained MAC address as a search key, and acquires traffic processing information 43 as an output of a result of the search.

The control processing unit 110 adds an entry including a set of the retained IP address and the acquired traffic processing information to the user IP identification table 101. Next, the control processing unit 110 notifies the transfer processing unit 140 of the addition of the relevant entry. In other words, the control processing unit 110 notifies the transfer processing unit 140 of the set of the IP address and the traffic processing information added as an entry to the user IP identification table 101, as an entry to be added to the user IP identification table 143.

The transfer processing unit 140 notified of the addition of the entry adds, in accordance with the notice, the notified entry including the set of the IP address and the traffic processing information to the user IP identification table 143.

In a case where the ARP table 102 retains the IP address 40, the port identifier, and the MAC address 41 in correspondence to one another, the control processing unit 110 temporarily retains, in the memory 105, the port identifier used for adding the entry to the ARP table 102. In that case, the control processing unit 110 acquires, from the user MAC identification table 103, the traffic processing information using the MAC address and the port identifier as search keys.

Next, a description will be given for a flow of processing for deleting an entry from the user IP identification tables 101 and 143 triggered by deletion of an entry from the ARP table 102.

Triggered by the deletion of an entry of the ARP table 102 in accordance with processing of a protocol of a packet received through the transfer processing unit 140, or a configuration input through the transfer processing unit 140, the control processing unit 110 searches the IP address 44 of the user IP identification table 101 using, as a search key, the IP address used for deleting the entry of the ARP table 102, and deletes a matching entry.

Next, the control processing unit 110 notifies the transfer processing unit 140 of the deletion of the relevant entry. In other words, the control processing unit 110 notifies the transfer processing unit 140 of an IP address of the entry to be deleted. The transfer processing unit 140 notified of the deletion of the entry deletes, in accordance with the notice, the entry including the notified IP address from the user IP identification table 143.

Next, a description will be given for a flow of processing for adding an entry to the user IP identification tables 101 and 143 triggered by addition of an entry to the user MAC identification table 103.

Triggered by the addition of an entry to the user MAC identification table 103 in accordance with a configuration input through the transfer processing unit 140, the control processing unit 110 temporarily retains, in the memory 105, the MAC address and the traffic processing information used for adding the entry to the user MAC identification table 103. Next, the control processing unit 110 uses the retained MAC address to search the IP address 40 of the ARP table 102, and acquires a corresponding IP address.

The control processing unit 110 adds an entry including a set of the acquired IP address and the retained traffic processing information to the user IP identification table 101. Next, the control processing unit 110 notifies the transfer processing unit 140 of the addition of the relevant entry. In other words, the control processing unit 110 notifies the transfer processing unit 140 of the set of the IP address and the traffic processing information added as an entry to the user IP identification table 101, as an entry to be added to the user IP identification table 143.

The transfer processing unit 140 notified of the addition of the entry adds, in accordance with the notice, the notified entry including the set of the IP address and the traffic processing information to the user IP identification table 143. In a case where the user MAC identification table 103 retains the MAC address 42, the port identifier, and the traffic processing information 43 in correspondence to one another, the control processing unit 110 temporarily retains, in the memory 105, also the port identifier used for adding the entry to the user MAC identification table 103. In that case, the control processing unit 110 acquires the IP address from the ARP table 102 using the MAC address and the port identifier as search keys.

Next, a description will be given for a flow of processing for deleting an entry from the user IP identification tables 101 and 143 triggered by deletion of an entry from the user MAC identification table 103.

Triggered by the deletion of an entry from the user MAC identification table 103 in accordance with a configuration input through the transfer processing unit 140, the control processing unit 110 uses the MAC address used for deleting the entry from the user MAC identification table 103 to search the ARP table 102, and acquires a corresponding IP address. The control processing unit 110 searches the user IP identification table 101 using the acquired IP address as a search key, and deletes a matching entry.

Next, the control processing unit 110 notifies the transfer processing unit 140 of the deletion of the relevant entry. The transfer processing unit 140 notified of the deletion of the entry deletes the entry from the user IP identification table 143.

As described above, by updating the user IP identification table 101 triggered by the update of the ARP table 102 or the update of the user MAC identification table 103, it is possible for the gateway router 100 to maintain the user IP identification table 101 up-to-date without receiving an update instruction for the user IP identification table 101 from the management device.

Figure 13:
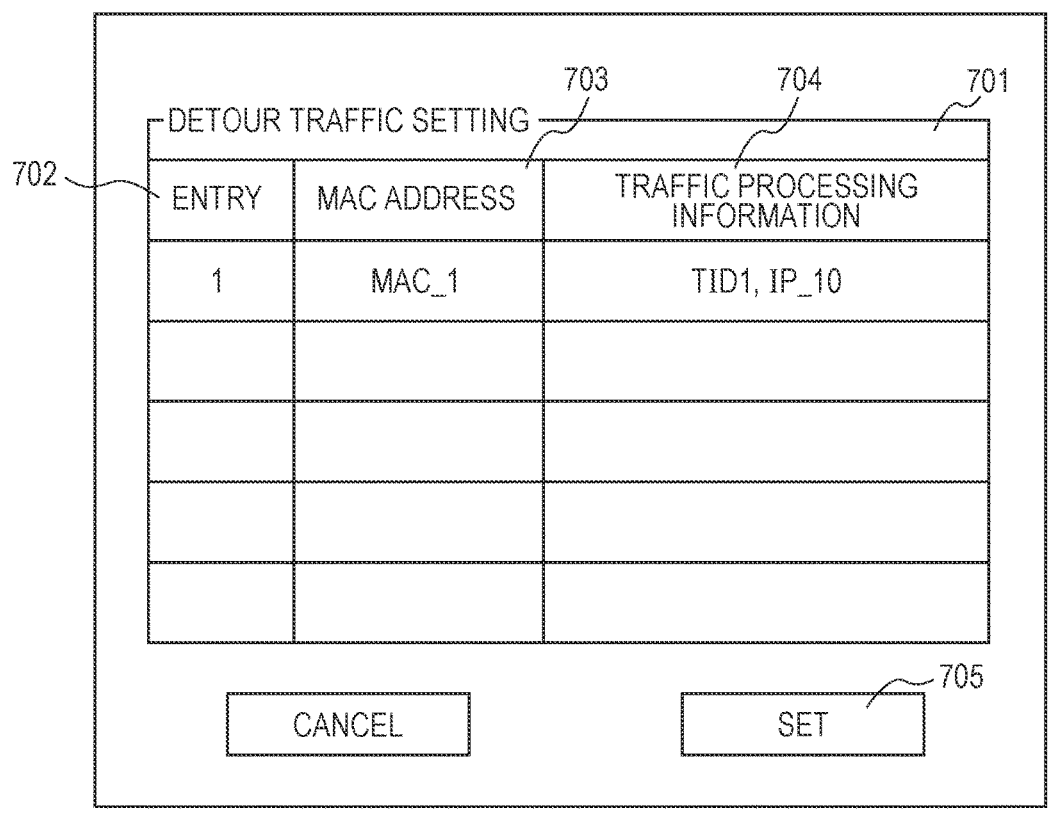
FIG. 13 is an explanatory view illustrating an example of a setting screen displayed on a management device for setting traffic to be detoured to a server.

FIG. 13 is an explanatory view illustrating an example of a setting screen displayed on a management device for setting traffic to be detoured to a server. Detour traffic setting 701 for setting traffic to be detoured to the server 30 is displayed on the setting screen 700. The detour traffic setting 701 displays a list of information of traffic to be detoured to the server 30, and displays a list of information of an entry 702, a MAC address 703, and traffic processing information 704. The MAC address 703 sets a MAC address of the user terminal 10 which specifies traffic, and the traffic processing information 704 sets processing information of traffic to be detoured to the server 30. The management device accepts, from an administrator, the setting (registration) of the traffic to be detoured to the server 30, and displays the setting (registration) in the detour traffic setting 701.

Upon depressing a button 705 which reads "set", information of traffic to be detoured to the server 30 is transmitted as a configuration from the management device to the gateway router 100. The control processing unit 110 generates and updates the user MAC identification table 103 in accordance with the configuration input from the management device.

Second Embodiment

In a second embodiment, a gateway router 100 is configured to be a distributed architecture.

Figure 8:
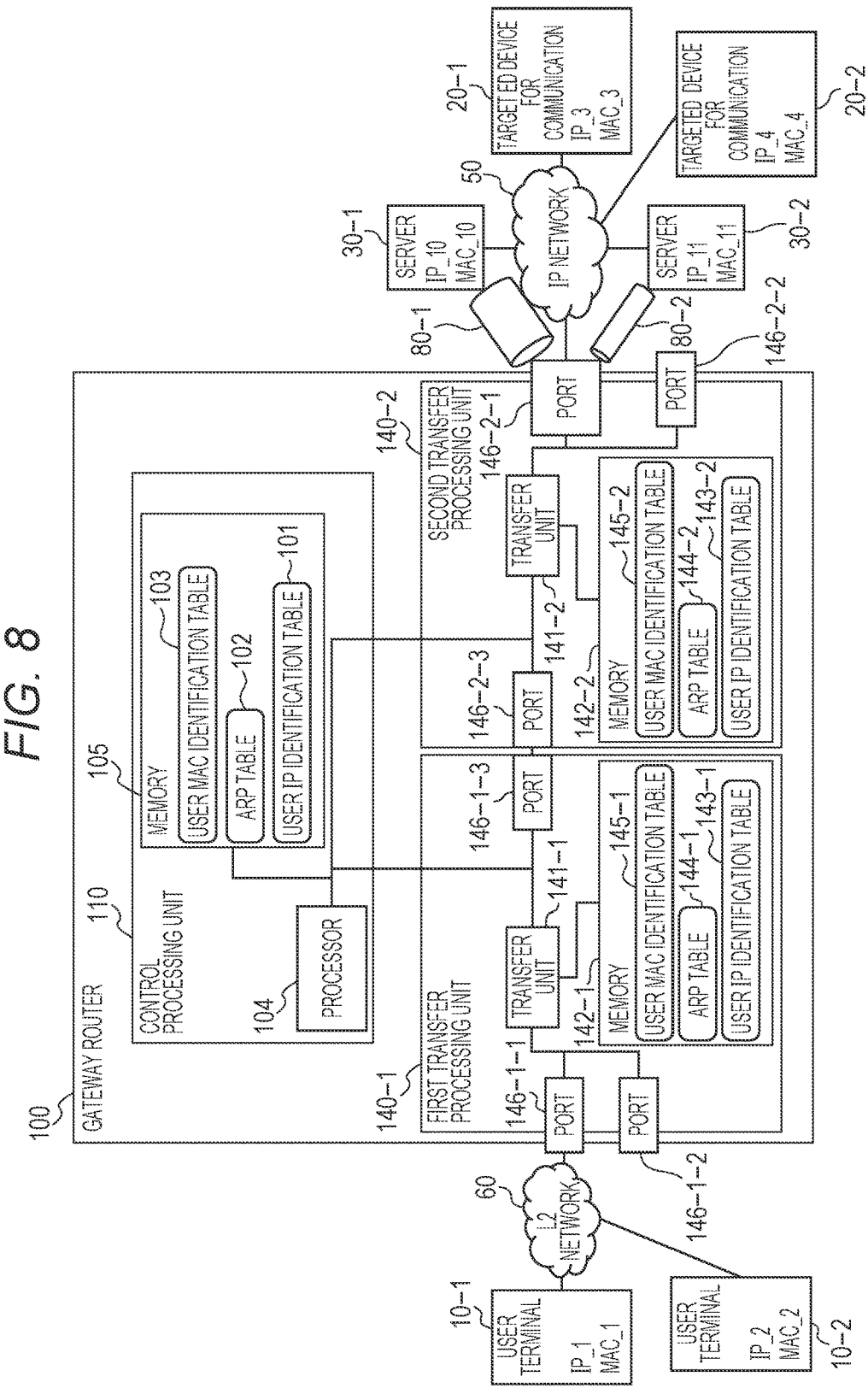
FIG. 8 is an example of a configuration diagram of a whole network in a second embodiment.

FIG. 8 is an example of a configuration diagram of a whole network in the second embodiment. The gateway router 100 includes a control processing unit 110 and a plurality of transfer processing units 140. In the following description, the same reference numerals are used to indicate the same portion or the portion having the same function as that of the first embodiment, and a repeated description thereof will be omitted.

Although only two transfer processing units 140 are illustrated in FIG. 8 as an example, there may be two or more transfer processing units, actually. Such a configuration is generally called a distributed architecture. Hereinafter, for the sake of simple description, the transfer processing unit 140 connected to an L2 network 60 is defined as a first transfer processing unit 140-1, and the transfer processing unit 140 connected to an IP network 50 is defined as a second transfer processing unit 140-2. The first transfer processing unit 140-1 and the second transfer processing unit 140-2 may be connected by an internal port, and in addition, may be connected through a switch fabric.

The first transfer processing unit 140-1 identifies traffic from the L2 network 60, and the second transfer processing unit 140-2 identifies traffic from the IP network 50. Each of the identified traffic is detoured to the server 30 through the second transfer processing unit 140-2. The transfer unit 141 performs, in addition to update of a header portion of a packet, addition and removal of an internal header used in the gateway router 100.

The control processing unit 110 retains a user IP identification table 101, an ARP table 102, and a user MAC identification table 103. The transfer processing units 140-1 and 140-2 retain user IP identification tables 143-1 and 143-2, ARP tables 144-1 and 144-2, and user MAC identification tables 145-1 and 145-2, respectively.

The control processing unit 110 includes tables serving as a master, respectively, and when updating the content of the tables, the control processing unit 110 notifies the transfer processing units 140-1 and 140-2 of the content of the update of the tables, respectively. The transfer processing units 140-1 and 140-2 notified thereof update the retained tables, respectively, in accordance with the content of the notice. As a result, the content of the user IP identification tables, the ARP tables, and the user MAC identification tables retained in the control processing unit 110 and the transfer processing units 140-1 and 140-2 becomes identical, respectively.

Figure 9:
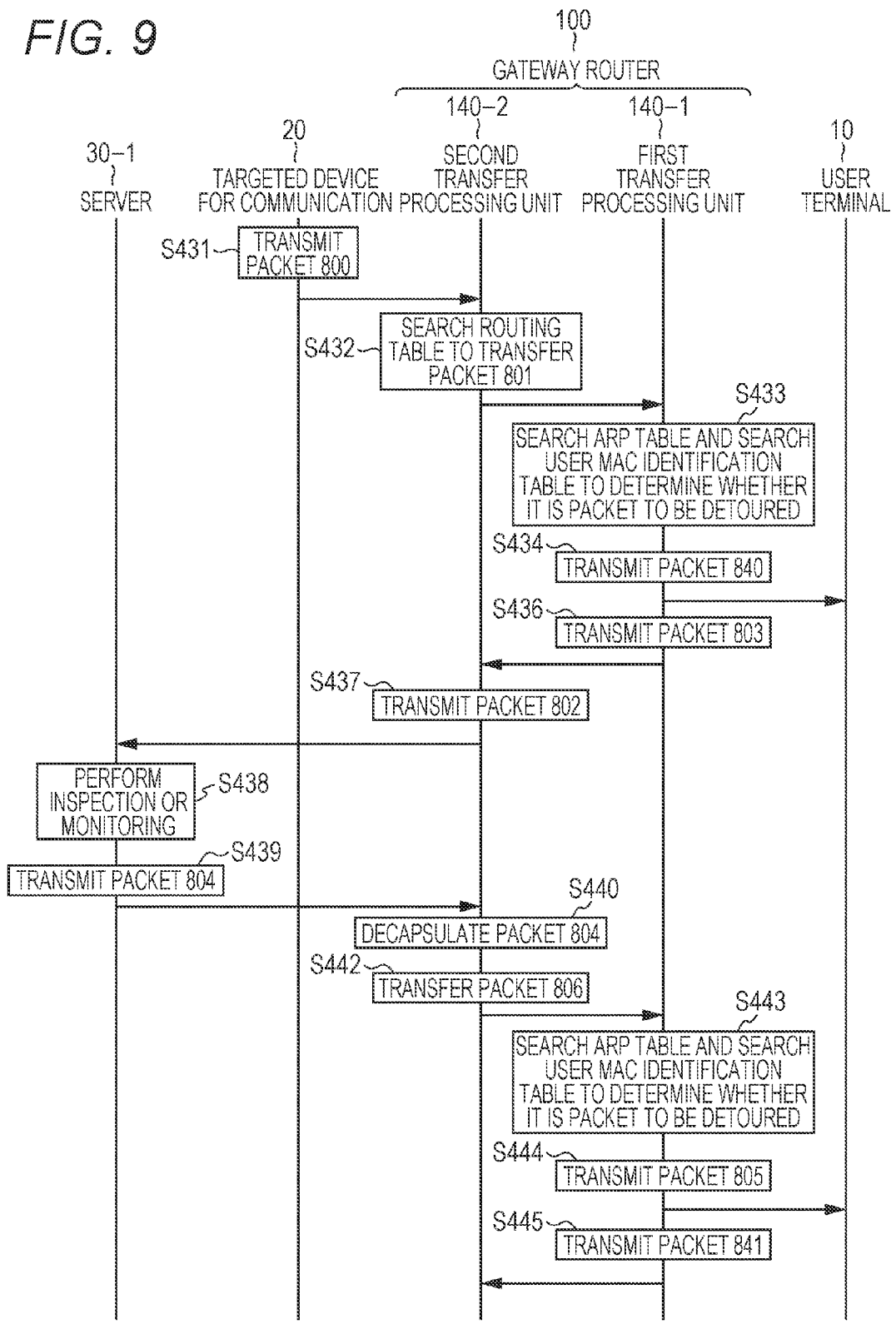
FIG. 9 is an example of a sequence of processing (No. 1) in which a gateway router configured to be a distributed architecture detours a packet, which has been transmitted to a user terminal from a targeted device for communication, to a server.

FIG. 9 is an example of a sequence of transfer processing (No. 1) performed when a gateway router configured to be a distributed architecture receives a packet, which has been transmitted to a user terminal from a targeted device for communication. Referring to FIG. 9, an example will be described in which the transfer processing unit 140 operates without using the user IP identification table 143.

First, a targeted device for communication 20 transmits a packet 800 to a user terminal 10 (S431). The packet 800 received by the gateway router 100 includes header information of a source IP address: an IP address of the targeted device for communication 20, a destination IP address: an IP address of the user terminal 10, a source MAC address: a MAC address of a communication device (not illustrated) (next hop) neighbor to the gateway router 100 through which the packet 800 addressed to a port 146-2-1 is routed, and a destination MAC address: a MAC address of the port 146-2-1.

The second transfer processing unit 140-2 of the gateway router 100 receives the packet 800, and transfers the packet 800 to the first transfer processing unit 140-1 in accordance with routing processing referring to the routing table retained in the second transfer processing unit 140-2 (S432). Specifically, the second transfer processing unit 140-2 specifies that the source of the packet 800 is the IP network 50, based on the port 146 which has received the packet 800, and then searches the routing table based on the header information of the packet 800. In accordance with a result of the search, the second transfer processing unit 140-2 adds an internal header used in the gateway router 100, and transfers (transmits) a packet 801 to which the internal header has been added, to the first transfer processing unit 140-1 through the internal port indicated by a port identifier of the search result.

The first transfer processing unit 140-1 receives the packet 801 transferred from the second transfer processing unit 140-2, and determines whether the packet is a packet to be detoured to the server 30 (S433).

Specifically, the first transfer processing unit 140-1 specifies that the source of the packet 801 is the second transfer processing unit 140-2, based on the internal port which has received the packet 801, then removes the internal header from the packet 801, searches the ARP table 144-1 using, as a search key, the destination IP address of the packet 800 (the IP address of the user terminal 10) in which the internal header has been removed, and determines a destination MAC address corresponding to the destination IP address of the packet 800. The first transfer processing unit 140-1 searches the user MAC identification table 145-1 using the determined destination MAC address as a search key to determine whether the packet is a packet to be detoured to the server 30 (S433).

In a case where the packet 800 is not a packet to be detoured, the first transfer processing unit 140-1 searches the routing table to transmit a packet 840 in which header information has been updated, to the user terminal 10 (S434). In a case where the packet 800 is a packet to be detoured, the first transfer processing unit 140-1 uses the traffic processing information 43 to provide an added header to the packet 800 for encapsulation, searches the routing table using, as a search key, header information of the encapsulated packet 802. In accordance with a result of the search, the first transfer processing unit 140-1 adds an internal header, and transmits a packet 803 to which the internal header has been added, to the second transfer processing unit 140-2 through the internal port indicated by a port identifier of the search result (S436).

The second transfer processing unit 140-2 transmits the packet 803 transferred from the first transfer processing unit 140-1 to the server 30-1 corresponding to the traffic processing information included in the packet 803 in accordance with routing processing referring to the routing table (S437). Specifically, the second transfer processing unit 140-2 specifies that the source of the packet 803 is the first transfer processing unit 140-1, based on the internal port which has received the packet 803, then removes the internal header from the packet 803, and searches the routing table using, as a search key, header information of the packet 802 in which the internal header has been removed. In accordance with a result of the search, the second transfer processing unit 140-2 updates the header information (destination MAC address and source MAC address) of the packet 802, and transmits the packet 802 to the server 30-1 through the port 146 indicated by a port identifier of the search result (S437).

The packet 802 includes header information of a tunnel identifier: a tunnel identifier of a tunnel 80-1, a source IP address: an IP address of a port (not illustrated) which belongs to the tunnel 80-1, a destination IP address: an IP address of the server 30-1, a source MAC address: a MAC address of the port (not illustrated) which belongs to the tunnel 80-1, a destination MAC address: a MAC address of a communication device (not illustrated) (next hop) neighbor to the gateway router 100 through which the packet 802 addressed to the server 30-1 is routed.

The server 30-1 performs processing such as inspection or monitoring to the packet 802 received from the gateway router 100 (S438), and transmits a packet 804 to the gateway router 100 (S439).

The second transfer processing unit 140-2 of the gateway router 100 specifies, with respect to the packet 804 received from the server 30-1, that the source of the packet 804 is the IP network 50, based on the port 146 which has received the packet 804. The second transfer processing unit 140-2 refers to port-tunnel correspondence information, and when a port identifier of the port 146 which has received the packet 804 matches a port identifier of the port-tunnel correspondence information, the second transfer processing unit 140-2 decapsulates the packet 804 (S440).

In the packet 804 before decapsulation received by the second transfer processing unit 140-2, header information has been updated by a communication device (not illustrated) located between the server 30-1 and the gateway router 100. The packet 804 includes header information of a tunnel identifier: a tunnel identifier of the tunnel 80-1, a source IP address: an IP address of the server 30-1, a destination IP address: an IP address of a port (not illustrated) which belongs to the tunnel 80-1, a source MAC address: a MAC address of a communication device (not illustrated) (next hop) neighbor to the gateway router 100 through which the packet 804 addressed to the port (not illustrated) which belongs to the tunnel 80-1 is routed, and a destination MAC address: a MAC address of the port (not illustrated) which belongs to the tunnel 80-1.

The second transfer processing unit 140-2 retains, as inside information, a processing result indicating that a packet 805 after decapsulation is the packet 804 transmitted from the server 30-1 and is a decapsulated packet. In accordance with a result of a search of the routing table based on header information of the packet 805, the second transfer processing unit 140-2 adds an internal header to the packet 805, and transfers a packet 806 to which the internal header has been added, to the first transfer processing unit 140-1 through the internal port indicated by a port identifier of the search result (S442).

When receiving the packet 806, the first transfer processing unit 140-1 searches the ARP table 144-1 and searches the user MAC identification table 145-1 to determine whether the packet is a packet to be detoured to the server 30 (S443). Specifically, the first transfer processing unit 140-1 specifies that the source of the packet 806 is the second transfer processing unit 140-2, based on the internal port which has received the packet 806, removes the internal header from the packet 806, searches the ARP table 144-1 using, as a search key, the destination IP address of the packet 805 (the IP address of the user terminal 10) in which the internal header has been removed, and determines the destination MAC address corresponding to the destination IP address of the packet 805.

The first transfer processing unit 140-1 searches the user MAC identification table 145-1 using the determined destination MAC address as a search key to determine whether a relevant entry exists (is hit). When the relevant entry exists, the first transfer processing unit 140-1 acquires the traffic processing information 43 of the relevant entry. Based on the acquired traffic processing information 43 and the inside information retained in step S442, the first transfer processing unit 140-1 determines that encapsulation processing is not performed in a case where the packet 806 is not a packet to be detoured, or where the relevant entry does not exist in the search of the user MAC identification table 145-1. In accordance with a result of a search of the routing table based on the header information of the packet 805, the first transfer processing unit 140-1 updates the header information (the destination MAC address and the source MAC address) of the packet 805, and transmits the packet 805 to the user terminal 10 through the port 146 indicated by a port identifier of the search result (S444).

The packet 805 includes header information of a source IP address: an IP address of the targeted device for communication 20, a destination IP address: an IP address of the user terminal 10, a source MAC address: a MAC address of the port 146-1-1, and a destination MAC address: a MAC address of the user terminal 10.

When the relevant entry exists in the search of the user MAC identification table 145-1 and the packet 806 is a packet to be detoured, the first transfer processing unit 140-1 operates in the same manner as in step S436 to add an internal header to a packet 841 and to transmit the packet 841 to the second transfer processing unit 140-2 (S445).

Figure 10:
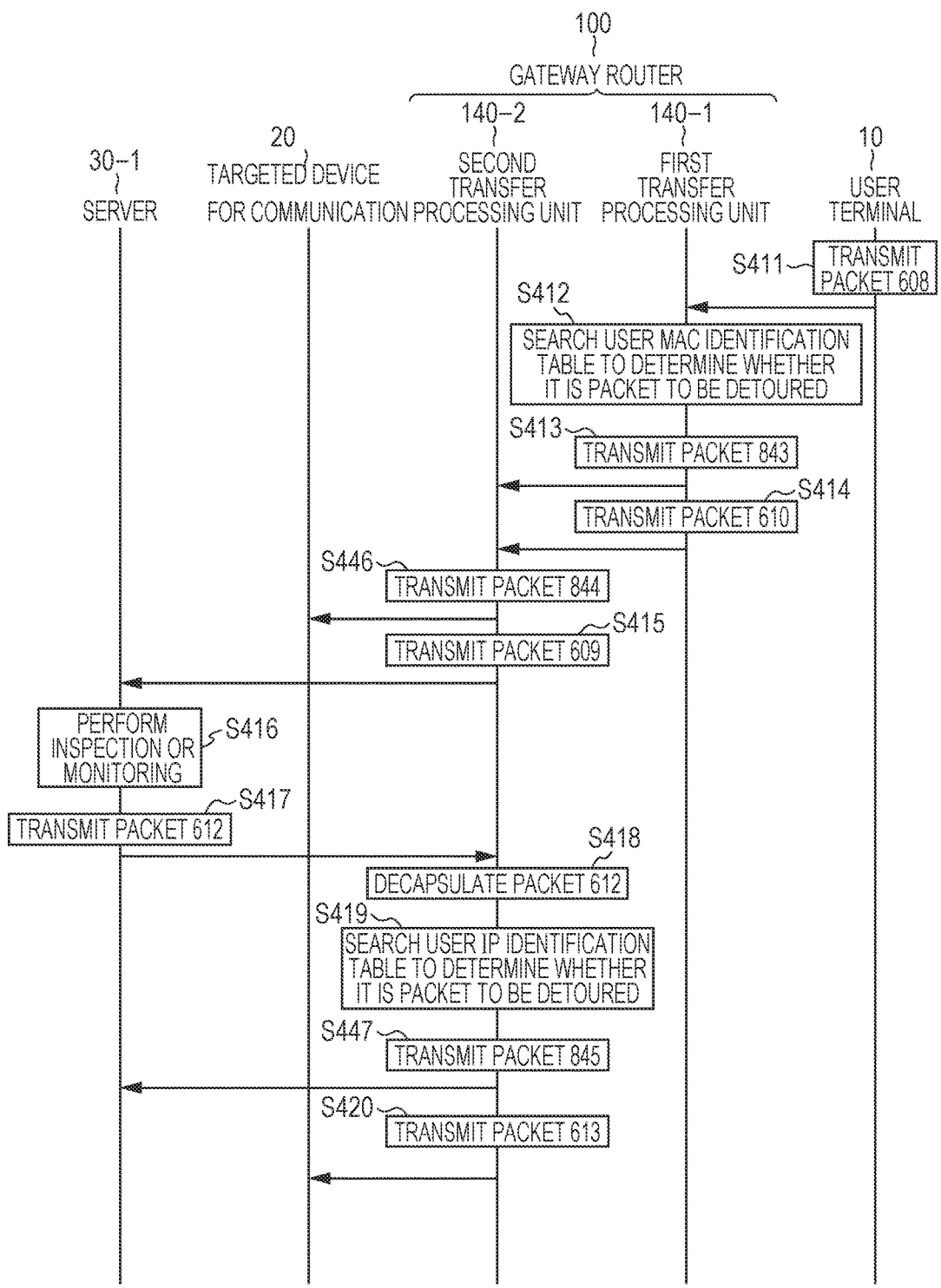
FIG. 10 is an example of a sequence of processing in which the gateway router configured to be a distributed architecture detours a packet, which has been transmitted to the targeted device for communication from the user terminal, to the server.

FIG. 10 is an example of a sequence of transfer processing performed when a gateway router configured to be a distributed architecture receives a packet, which has been transmitted to a targeted device for communication from a user terminal. Referring to FIG. 10, an example will be described in which the transfer processing unit 140 operates with the user IP identification table 143. First, the user terminal 10 transmits a packet 608 to the targeted device for communication 20 (S411). The packet 608 includes header information of a source IP address: an IP address of the user terminal 10, a destination IP address: an IP address of the targeted device for communication 20, a source MAC address: a MAC address of the user terminal 10, and a destination MAC address: a MAC address of the port 146-1-1.

The first transfer processing unit 140-1 of the gateway router 100 receives the packet 608 transmitted by the user terminal 10, searches the user MAC identification table 145-1 to determine whether the packet is a packet to be detoured to the server 30, and transfers the packet to the second transfer processing unit 140-2 (S412 to S414). Specifically, the first transfer processing unit 140-1 specifies that the source of the packet 608 is the L2 network 60, based on the port 146 which has received the packet 608, searches the user MAC identification table 145-1 using, as a search key, the source MAC address of the received packet 608 (the MAC address of the user terminal 10), and determines whether a relevant entry exists (is hit) (S412). In other words, the first transfer processing unit 140-1 determines in step S412 whether the packet is a packet to be detoured to the server 30 based on the source MAC address of the packet 608.

When the relevant entry does not exist in step S412, the first transfer processing unit 140-1 adds an internal header to the packet 608 in accordance with a result of a search of the routing table based on the header information of the packet 608, and transmits a packet 843 to which the internal header has been added, to the second transfer processing unit 140-2 through the internal port (S413).

When the relevant entry exists in step S412, the first transfer processing unit 140-1 determines that the packet 608 is a packet to be detoured to the server 30, acquires the traffic processing information 43 of the relevant entry, encapsulates the packet 608 using the acquired traffic processing information, searches the routing table using, as a search key, header information of the encapsulated packet 609. In accordance with a result of the search, the first transfer processing unit 140-1 adds an internal header, and transmits a packet 610 to which the internal header has been added, to the second transfer processing unit 140-2 through the internal port indicated by a port identifier of the search result (S414).

The second transfer processing unit 140-2 transmits the packet 844 obtained by removing the internal header from the packet 843 transferred from the first transfer processing unit 140-1 to the targeted device for communication 20 in accordance with routing processing referring to the routing table (S446). In addition, the second transfer processing unit 140-2 transmits the packet 610 transferred from the first transfer processing unit 140-1 to the server 30-1 corresponding to the traffic processing information included in the packet 610 in accordance with routing processing referring to the routing table (S415). Specifically, the second transfer processing unit 140-2 specifies that the source of the packet 610 is the first transfer processing unit 140-1, based on the internal port which has received the packet 610, then removes the internal header from the packet 610. In accordance with a result of the search of the routing table based on the header information of the packet 609 in which the internal header has been removed, the second transfer processing unit 140-2 updates the header information (a destination MAC address and a source MAC address) of the packet 609, and transmits the packet 609 to the server 30-1 through the port 146 indicated by a port identifier of the search result (S415).

The packet 609 includes header information of a tunnel identifier: a tunnel identifier of the tunnel 80-1, a source IP address: an IP address of a port (not illustrated) which belongs to the tunnel 80-1, a destination IP address: an IP address of the server 30-1, a source MAC address: a MAC address of the port (not illustrated) which belongs to the tunnel 80-1, a destination MAC address: a MAC address of a communication device (not illustrated) (next hop) neighbor to the gateway router 100 through which the packet 609 addressed to the server 30-1 is routed.

The server 30-1 performs processing such as inspection or monitoring to the packet 609 received from the gateway router 100 (S416), and transmits a packet 612 to the gateway router 100 (S417).

When receiving the packet 612 from the server 30-1, the second transfer processing unit 140-2 of the gateway router 100 specifies that the source of the packet 612 is the IP network 50, based on the port 146 which has received the packet 612. The second transfer processing unit 140-2 refers to port-tunnel correspondence information, and when a port identifier of the port 146 which has received the packet 612 matches a port identifier of the port-tunnel correspondence information, the second transfer processing unit 140-2 decapsulates the received packet 612 (S418).

In the packet 612 before decapsulation received by the second transfer processing unit 140-2, header information has been updated by a communication device (not illustrated) located between the server 30-1 and the gateway router 100. The packet 612 includes header information of a tunnel identifier: a tunnel identifier of the tunnel 80-1, a source IP address: an IP address of the server 30-1, a destination IP address: an IP address of a port (not illustrated) which belongs to the tunnel 80-1, a source MAC address: a MAC address of a communication device (not illustrated) (next hop) neighbor to the gateway router 100 through which the packet 612 addressed to the port (not illustrated) which belongs to the tunnel 80-1 is routed, and a destination MAC address: a MAC address of the port (not illustrated) which belongs to the tunnel 80-1.

The second transfer processing unit 140-2 searches the user IP identification table 143 to determine whether the packet is a packet to be detoured to the server 30 (S419). Specifically, the second transfer processing unit 140-2 retains inside information of a processing result indicating that a packet 613 after decapsulation is the packet 612 transmitted by the server 30-1 and is a decapsulated packet. The second transfer processing unit 140-2 searches the user IP identification table 143 using, as a search key, the destination IP address of the packet 613 (the IP address of the targeted device for communication 20), and determines whether a relevant entry exists (is hit). When the relevant entry does not exist, the second transfer processing unit 140-2 searches the user IP identification table 143 again using, as a search key, the source IP address of the packet 613 (the IP address of the user terminal 10), and determines whether a relevant entry exists (is hit).

When the relevant entry exists, the second transfer processing unit 140-2 acquires the traffic processing information 45 of the relevant entry. Then, based on the acquired traffic processing information 45 and the retained inside information, the second transfer processing unit 140-2 determines whether the packet 613 is a packet to be detoured to the server 30 (S419).

When the packet 613 is a packet to be detoured, the second transfer processing unit 140-2 encapsulates the packet 613 using the traffic processing information 45. In accordance with a result of a search of the routing table based on header information of an encapsulated packet 845, the second transfer processing unit 140-2 updates the header information of the packet 845 and transmits the packet 845 to the server 30-1 as a detour destination (S447).

When the relevant entry does not exist in the search of the user IP identification table 143, or when the received packet 613 is not a packet to be detoured to the server 30 in step S419, the second transfer processing unit 140-2 updates, in accordance with a result of a search of the routing table based on header information of the packet 613, the header information (a destination MAC address and a source MAC address) of the packet 613, and transmits the packet 613 to the targeted device for communication 20 through the port 146 indicated by a port identifier of the search result (S420).

The packet 613 includes header information of a source IP address: an IP address of the user terminal 10, a destination IP address: an IP address of the targeted device for communication 20, a source MAC address: a MAC address of the port 146-2-1, and a destination MAC address: a MAC address of a communication device (not illustrated) (next hop) neighbor to the gateway router 100 through which the packet 613 addressed to the targeted device for communication 20 is routed.

Figure 11:
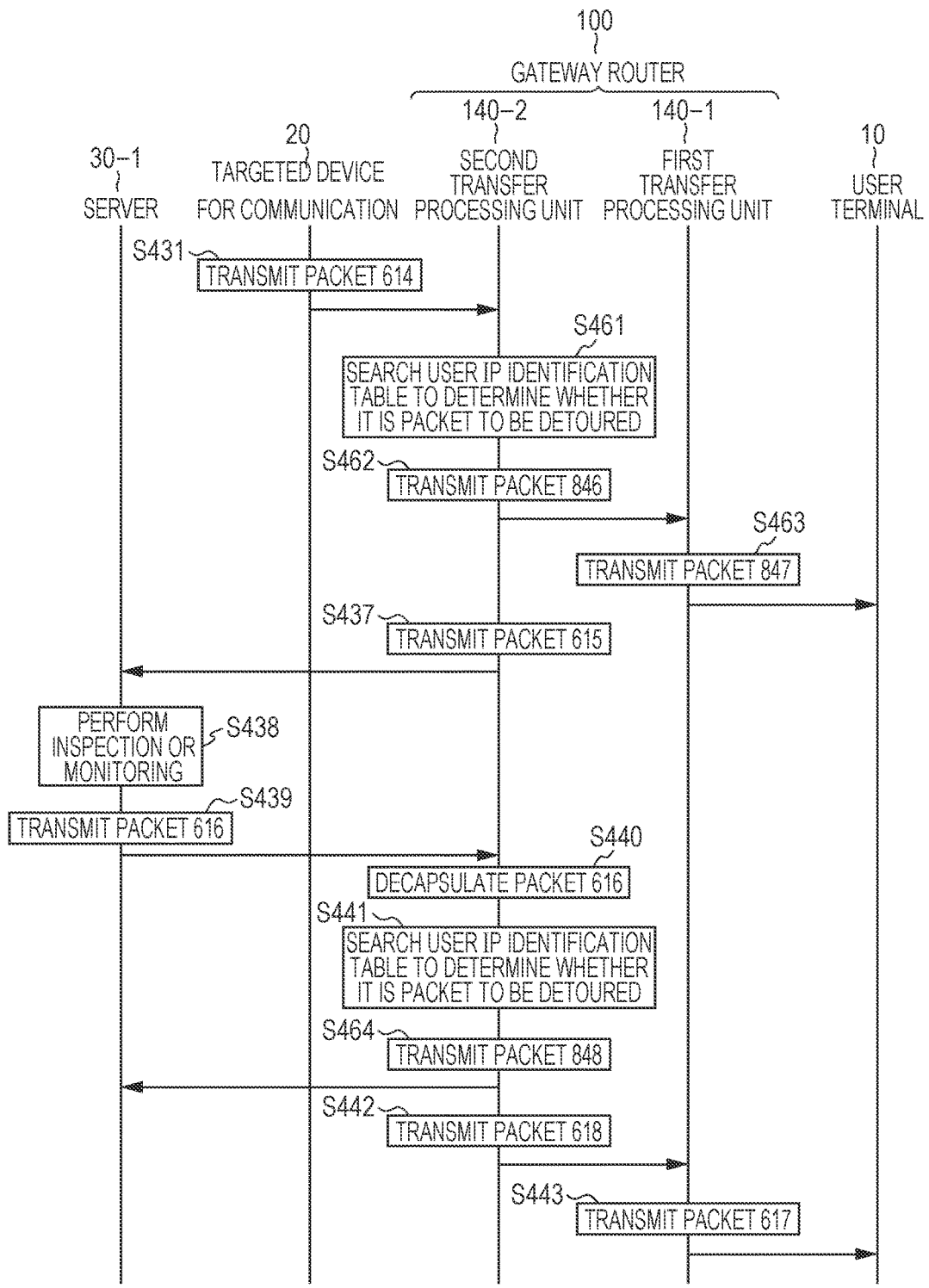
FIG. 11 is an example of a sequence of processing (No. 2) in which the gateway router configured to be a distributed architecture detours a packet, which has been transmitted to the user terminal from the targeted device for communication, to the server.

FIG. 11 is an example of a sequence of transfer processing (No. 2) performed when a gateway router configured to be a distributed architecture receives a packet which has been transmitted to the user terminal from the targeted device for communication. Referring to FIG. 11, an example will be described in which the transfer processing unit 140 operates with the user IP identification table 143.

The processing (No. 2) in FIG. 11 is processing for detouring the packet to the server 30 using the MAC address of the user terminal 10 while suppressing the consumption of a transfer band in the gateway router 100 caused by processing for determining whether the packet is a packet to be detoured to the server 30 in the processing (No. 1) in FIG. 9 (a series of processing from step S432 to step S436 in FIG. 9).

First, the targeted device for communication 20 transmits a packet 614 to the user terminal 10 (S431). The packet 614 includes header information of a source IP address: an IP address of the targeted device for communication 20, a destination IP address: an IP address of the user terminal 10, a source MAC address: a MAC address of a communication device (not illustrated) (next hop) neighbor to the gateway router 100 through which the packet 614 addressed to the port 146-2-1 is routed, and a destination MAC address: a MAC address of the port 146-2-1.

The second transfer processing unit 140-2 of the gateway router 100 receives the packet 614 transmitted by the targeted device for communication 20, searches the user IP identification table 143-2 to determine whether the packet is a packet to be detoured to the server 30 (S461). Specifically, the second transfer processing unit 140-2 specifies that the source of the packet 614 is the IP network 50, based on the port 146 which has received the packet 614, searches the user IP identification table 143-2 using, as a search key, the destination IP address of the received packet 614 (the IP address of the user terminal 10), and determines whether a relevant entry exists (is hit) (S461).

When the relevant entry does not exist in step S461, the second transfer processing unit 140-2 determines that the packet 614 is not a packet to be detoured to the server 30 but a packet to be transmitted to the user terminal 10. In accordance with a result of a search of the routing table based on the header information of the packet 614, the second transfer processing unit 140-2 adds an internal header and transfers (transmits) a packet 846 to which the internal header has been added, to the first transfer processing unit 140-1 (S462). The first transfer processing unit 140-1 transmits a packet 847 obtained by removing the internal header from the packet 846 to the user terminal 10 in accordance with routing processing referring to the routing table (S463).

When the relevant entry exists in step S461, the second transfer processing unit 140-2 determines that the packet 614 is a packet to be detoured to the server 30, acquires the traffic processing information 45 of the relevant entry, encapsulates the packet 614 using the acquired traffic processing information. In accordance with a result of a search of the routing table based on header information of the encapsulated packet 615, the second transfer processing unit 140-2 updates the header information (a destination MAC address and a source MAC address) of the encapsulated packet 615, and transmits the packet 615 to the server 30-1 corresponding to the traffic processing information included in the packet 615 through the port 146 indicated by a port identifier of the search result (S437).

The packet 615 includes header information of a tunnel identifier: a tunnel identifier of the tunnel 80-1, a source IP address: an IP address of a port (not illustrated) to which the tunnel 80-1 belongs, a destination IP address: an IP address of the server 30-1, a source MAC address: a MAC address of the port (not illustrated) to which the tunnel 80-1 belongs, a destination MAC address: a MAC address of a communication device (not illustrated) (next hop) neighbor to the gateway router 100 through which the packet 615 addressed to the server 30-1 is routed.

The server 30-1 performs processing such as inspection or monitoring to the packet 615 received from the gateway router 100 (S438), and transmits a packet 616 to the gateway router 100 (S439).

The second transfer processing unit 140-2 of the gateway router 100 specifies, with respect to the packet 616 received from the server 30-1, that the source of the packet 616 is the IP network 50, based on the port 146 which has received the packet 616. The second transfer processing unit 140-2 refers to port-tunnel correspondence information, and when a port identifier of the port 146 which has received the packet 616 matches a port identifier of the port-tunnel correspondence information, the second transfer processing unit 140-2 performs decapsulation processing with respect to the packet 616 (S440).

In the packet 616 before decapsulation received by the second transfer processing unit 140-2, header information has been updated by a communication device (not illustrated) located between the server 30-1 and the gateway router 100. The packet 616 includes header information of a tunnel identifier: a tunnel identifier of the tunnel 80-1, a source IP address: an IP address of the server 30-1, a destination IP address: an IP address of a port (not illustrated) to which the tunnel 80-1 belongs, a source MAC address: a MAC address of a communication device (not illustrated) (next hop) neighbor to the gateway router 100 through which the packet 616 addressed to the port (not illustrated) to which the tunnel 80-1 belongs is routed, and a destination MAC address: a MAC address of the port (not illustrated) to which the tunnel 80-1 belongs.

The second transfer processing unit 140-2 searches the user IP identification table 143 to determine whether the packet is a packet to be detoured to the server 30 or any other servers (S441). Specifically, the second transfer processing unit 140-2 retains inside information of a processing result indicating that the packet 617 after decapsulation is a packet 616 transmitted from the server 30-1 and is a decapsulated packet. The second transfer processing unit 140-2 searches the user IP identification table 143-2 using, as a search key, the destination IP address of the packet 617 (the IP address of the user terminal 10), and determines whether a relevant entry exists (is hit).

When the relevant entry exists, the second transfer processing unit 140-2 acquires the traffic processing information 45 of the relevant entry. Then, based on the acquired traffic processing information 45 and the retained inside information, the second transfer processing unit 140-2 determines whether the packet 617 is a packet to be detoured to the server 30 (S441).

When the packet 617 is a packet to be detoured, the second transfer processing unit 140-2 encapsulates the packet 617 using the traffic processing information 45. In accordance with a result of a search of the routing table based on header information of an encapsulated packet 848, the second transfer processing unit 140-2 updates the header information of the packet 848 and transmits the packet 848 to the server 30-1 as a detour destination (S464).

When the relevant entry does not exist in the search of the user IP identification table 143, or when the packet 617 is not a packet to be detoured to the server 30 in step S441, the second transfer processing unit 140-2 adds an internal header to the packet 617 in accordance with a result of a search of the routing table based on the header information of the packet 617, and transmits (transfers) a packet 618 to which the internal header has been added, to the first transfer processing unit 140-1 through the internal port (S442).

The first transfer processing unit 140-1 transmits the packet 618 transferred from the second transfer processing unit 140-2 to the user terminal 10 in accordance with routing processing referring to the routing table (S443). Specifically, the first transfer processing unit 140-1 specifies that the source of the packet 618 is the second transfer processing unit 140-2, based on the internal port which has received the packet 618, then removes the internal header from the packet 618. In accordance with a result of a search of the routing table based on the header information of the packet 617 in which the internal header has been removed, the first transfer processing unit 140-1 updates the header information (a destination MAC address and a source MAC address) of the packet 617, and transmits the packet 617 to the user terminal 10 through the port 146 indicated by a port identifier of the search result (S443).

The packet 617 includes header information of a source IP address: an IP address of the targeted device for communication 20, a destination IP address: an IP address of the user terminal 10, a source MAC address: a MAC address of the port 146-1-1, and a destination MAC address: a MAC address of the user terminal 10.

The consumption of a transfer band in the gateway router 100 caused when a packet is detoured to the server 30 will be described. In order to determine the destination MAC address in step S433 in FIG. 9, the packet is transferred to the first transfer processing unit 140-1 from the second transfer processing unit 140-2 in step S432. After the determination of the destination MAC address, when the packet is relayed to the IP network 50, the packet is transferred again in step S436 in such away that the packet is looped back to the second transfer processing unit 140-2 from the first transfer processing unit 140-1. Consequently, a transfer band in the gateway router 100 is consumed when a packet is detoured to the server 30.

On the other hand, in steps S461, S462, and S437 in FIG. 11, the second transfer processing unit 140-2 of the gateway router 100 detours the packet to the server 30 without transferring the packet to the first transfer processing unit 140-1. Therefore, the processing (No. 2) in FIG. 11 can suppress the consumption of the transfer band in the gateway router 100 caused when the packet is detoured to the server 30, in comparison to the processing in steps S432 to S437 in FIG. 9.

The following processing mode is also possible: insteps S461, S462, and S437 in FIG. 11, when receiving the packet from the IP network 50, the second transfer processing unit 140-2 searches the ARP table 144-2 to acquire a MAC address, uses the acquired MAC address to search the user MAC identification table 145-2, thereby detouring the packet to the server 30 without transferring the packet to the first transfer processing unit 140-1.

In general, for the purpose of accelerating packet transfer processing, a dedicated hardware is mounted in the transfer processing unit 140 to perform a search of the ARP table 144 or processing of a protocol such as routing processing. Therefore, from the viewpoints of processing time taken for a plurality of search processing operations and a circuit scale, the processing (No. 2) in FIG. 11 can suppress processing delay and an increase in the circuit scale.

By the processing described above, a gateway router configured to be a distributed architecture can detour traffic to a server using a MAC address of a user terminal. In addition, a gateway router configured to be a distributed architecture can detour traffic to a server using a MAC address of a user terminal while suppressing the consumption of a transfer band in the gateway router.

Next, details of generation and update of the user IP identification tables 101, 143-1 and 143-2 will be described focused on the difference from those of the first embodiment.

A description will be given for a flow of processing for adding an entry to the user IP identification tables 101, 143-1, and 143-2 triggered by addition of an entry to the ARP table 102. Triggered by addition of an entry to the ARP table 102 in accordance with processing of a protocol or an input configuration, the control processing unit 110 adds an entry to the user IP identification table 101 in the same manner as in the first embodiment.

Difference from the first embodiment resides in that when adding an entry to the user IP identification table 101, the control processing unit 110 notifies a plurality of transfer processing units 140-1 and 140-2 of the addition of the relevant entry, and the transfer processing units 140-1 and 140-2 add an entry to the user IP identification tables 143-1 and 143-2, respectively, in accordance with the notice.

In a case of deletion of an entry from the user IP identification tables 101, 143-1, and 143-2 triggered by deletion of an entry from the ARP table 102, difference from the first embodiment resides in that when deleting an entry from the user IP identification table 101 triggered by the deletion of an entry from the ARP table 102, the control processing unit 110 notifies the plurality of transfer processing units 140-1 and 140-2 of the deletion of the relevant entry, and the transfer processing units 140-1 and 140-2 delete an entry from the user IP identification tables 143-1 and 143-2, respectively, in accordance with the notice.

In a case of addition of an entry to the user IP identification tables 101, 143-1, and 143-2 triggered by addition of an entry to the user MAC identification table 103, difference from the first embodiment resides in that when adding an entry to the user IP identification table 101 triggered by the addition of an entry to the user MAC identification table 103, the control processing unit 110 notifies the plurality of transfer processing units 140-1 and 140-2 of the addition of the relevant entry, and the transfer processing units 140-1 and 140-2 add an entry to the user IP identification tables 143-1 and 143-2, respectively, in accordance with the notice.

In a case of deletion of an entry from the user IP identification tables 101, 143-1, and 143-2 triggered by deletion of an entry from the user MAC identification table 103, difference from the first embodiment resides in that when deleting an entry from the user IP identification table 101 triggered by the deletion of an entry from the user MAC identification table 103, the control processing unit 110 notifies the plurality of transfer processing units 140-1 and 140-2 of the deletion of the relevant entry, and the transfer processing units 140-1 and 140-2 delete an entry from the user IP identification tables 143-1 and 143-2, respectively, in accordance with the notice.

There may be another mode for notification by the control processing unit 110 of the content of update of the user MAC identification table 103 and the user IP identification table 101 to the first transfer processing unit 140-1 and the second transfer processing unit 140-2, as follows. The control processing unit 110 may notify each of the transfer processing units 140, i.e. the first transfer processing unit 140-1 and the second transfer processing unit 140-2, only of an entry which each transfer processing unit 140 uses. By doing so, it is possible to save memory usage in the first transfer processing unit 140-1 and the second transfer processing unit 140-2.

(Variation of Second Embodiment)

Figure 14:
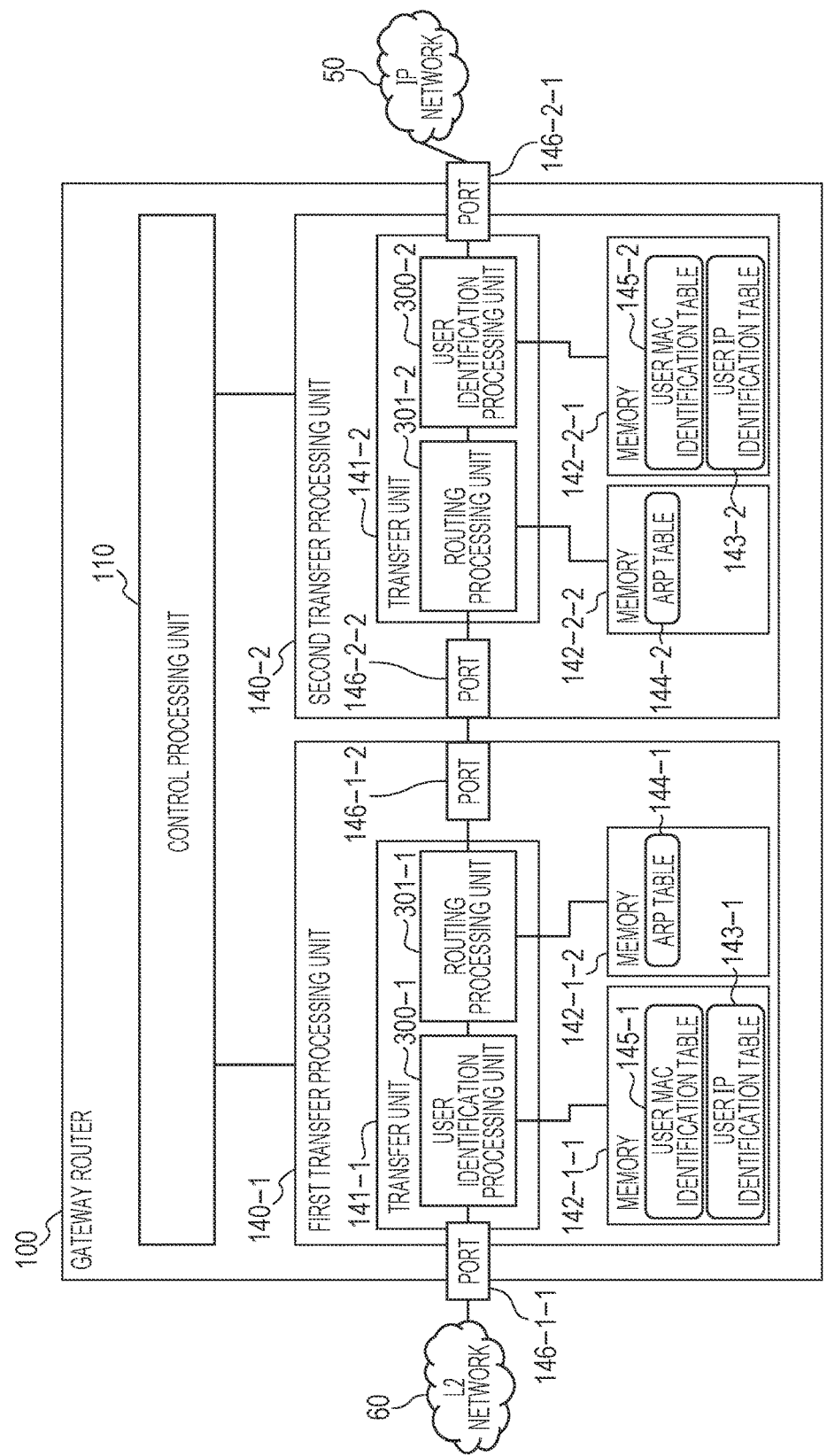
FIG. 14 is an example of a configuration diagram of a whole network in a variation of the second embodiment.

FIG. 14 is an example of a configuration diagram of a whole network in a variation of the second embodiment. As a more detailed example of the second embodiment, the transfer processing unit 140 may have a configuration illustrated in FIG. 14. A first transfer processing unit 140-1 and a second transfer processing unit 140-2 include a user identification processing unit 300 and a routing processing unit 301. The user identification processing unit 300 includes a network processor of which the function can be installed by an assembler language or a relatively high-layer language such as a C language. The routing processing unit 301 includes a hardware such as a dedicated application specific integrated circuit (ASIC) in which a function such as ARP processing or routing processing is installed, or an FPGA.

The user identification processing unit 300 connects to a memory which has stored a user MAC identification table 145 and a user IP identification table 143 therein, and has functions to search tables, to identify a user terminal in accordance with the search results, and to encapsulate a packet. The routing processing unit 301 connects to a memory which has stored an ARP table 144 and a routing table (not illustrated) therein, and has functions to search tables, to determine a destination of a packet, and to updated header information of the packet in accordance with the search result.

The user identification processing unit 300 and the memory which connects thereto are mounted as a line card (line module), and the routing processing unit 301 is mounted as a slot card (slot module) which accommodates the line card. According to the configuration illustrated in FIG. 14, with the transfer processing unit 140 thus mounted, it is possible to use an existing ASIC or FPGA for general processing such as routing processing or ARP processing, and to perform high-layer programming for identification processing for a user terminal based on a search of the user MAC identification table 145 or a search of the user IP identification table 143, or encapsulating processing. Consequently, it is possible to reduce cost and time for development. The first and second embodiments have been described using the example in which the gateway router 100 establishes the tunnel 80 with the server 30, and when the gateway router 100 detours a packet to the server 30, the packet is encapsulated and then transferred. However, a mode of connection between the gateway router 100 and the server 30, and a mode of transfer of a packet between the gateway router 100 and the server 30 are not limited to the above example. For example, the gateway router 100 and the server 30 can be directly connected, and the gateway router 100 can use policy-based routing to detour a packet identified by using the user IP identification table 143 to the server 30.

The example has been described in which the gateway router 100 encapsulates a packet received from the L2 network 60 or the IP network 50, and searches the routing table to detour the encapsulated packet to the server 30. However, a mode of processing for determining the transmission to the server 30 is not limited to the search of the routing table, and may include a search of a policy-based routing table (not illustrated).

The example has been described in which inspection, analysis, or monitoring is performed as an example of processing performed by the server 30 to a packet received from the gateway router 100. However, a mode of processing performed by the server 30 is not limited to the above example. For example, in a case where the server 30 is an intrusion detection system (IDS), an intrusion protection system (IPS), a firewall device, a deep packet inspection (DPI) device, or a monitoring device, the server 30 performs analysis, monitoring, or inspection of a packet. However, the processing performed by the server 30 may be performed in another mode, such as a network address translation (NAT) device or a device for accelerating a transmission control protocol (TCP). The server 30 performs processing according to the modes.

The example has been described in which a packet is transmitted to the user terminal 10 or the targeted device for communication 20 as an example of processing performed by the gateway router 100 to a packet received from the server 30. However, a mode of processing performed by the gateway router 100, with respect to a packet received from the server 30, is not limited to the above example. For example, in a case where the gateway router 100 has received a packet from the server 30-1, the gateway router 100 uses header information included in the packet to acquire traffic processing information from the user IP identification table 143. It is also possible for the gateway router 100 to use information of an order of transmission to the servers 30-1 and 30-2, and information of encapsulating processing included in the acquired traffic processing information to perform encapsulating processing again to the received packet, and to transmit the packet to other server 30-2.

In the embodiment, the example in which the gateway router 100 connects to the IP network 50, the example in which a MAC address is used as a protocol of the L2, and the example in which the IP and the ARP are used as a protocol of the L3 have been described. However, a mode of the L3 network to which the gateway router 100 connects is not limited to the IP network, and modes of the L2 and the L3 protocols are not limited to the above examples.

The present invention is not limited to the embodiments described above, and includes different types of variations. For example, the embodiments described above have been described in detail for the purpose of clear description of the present invention, and the present invention is not necessarily limited to those including all configurations described in the embodiments. A part of a configuration of a particular embodiment can be substituted with a configuration of other embodiment, and to a configuration of a particular embodiment, a configuration of other embodiment can be added. Regarding a part of a configuration of each embodiment, other configuration may be added, deleted, or substituted. Regarding each configuration, function, processing unit, processing means, and the like described above, a part or all thereof may be realized with a hardware by designing the part or all thereof as an integrated circuit such as an FPGA. Each configuration, function, and the like described above may be realized with a software by a processor interpreting and executing a program which realizes each function. Information of a program, a table, a file, and the like for realizing each function can be placed in a recording device such as a memory, a hard disk, a solid state drive (SSD), or a recording medium such as an integrated circuit (IC) card, an SD card, and a DVD.

Although a variety of information has been described in the expression "aaa table", the variety of information may be expressed in a data structure other than a table. In order to indicate independence of the data structure, the "aaa table" may be referred to as "aaa information". Although recording of a variety of information on a variety of tables has been described in the expression "to store", the recording may be expressed as "to register" or "to set".

Regarding a control line and an information line, those which are considered to be required for explanation are illustrated, and all of the control lines and the information lines in a product are not necessarily illustrated. Actually, substantially all configurations may be considered to be connected to each other.

What is claimed is:

1. A transfer device comprising:
   a first port connected to a layer 3 network;
   a second port connected to a layer 2 network;
   a storage unit that stores data processing information with which a media access control (MAC) address of a communication device in the layer 2 network and information regarding processing of data are brought into correspondence with each other, and address information with which an internet protocol (IP) address and the MAC address of the communication device in the layer 2 network are brought into correspondence with each other; and
   a transfer unit that, when the transfer unit receives data addressed to the communication device in the layer 2 network through the first port, searches the address information based on an IP address included in the data to acquire a MAC address corresponding to the IP address included in the data, searches the data processing information based on the acquired MAC address, and depending on a result of the search, controls whether to transfer the data through the first port based on information regarding processing of data corresponding to the acquired MAC address,
   when the transfer unit receives data addressed to a communication device in the layer 3 network through the second port, the transfer unit searches the data processing information in the storage unit based on a MAC address included in the data, and depending on a result of the search, controls whether to transfer the data through the first port based on information regarding processing of data corresponding to the MAC address included in the data.

2. The transfer device according to claim 1, wherein
   the information regarding processing of data is layer 3 network destination information regarding a destination of data in the layer 3 network,
   the data processing information is first destination information with which the MAC address of the communication device in the layer 2 network and the layer 3 network destination information are brought into correspondence with each other, and
   the transfer unit controls, depending on the result of the search, whether to transfer the data through the first port to a destination in layer 3 network destination information corresponding to the acquired MAC address.

3. The transfer device according to claim 2, further comprising:
   a control processing unit that generates, based on the first destination information and the address information in the storage unit, second destination information with which the IP address in the address information and the layer 3 network destination information in the first destination information are brought into correspondence with each other, and causes the storage unit to store the generated second destination information, wherein
   when the transfer unit receives data addressed to the communication device in the layer 2 network through the first port, the transfer unit searches the second destination information based on an IP address included in the data, and depending on a result of the search, transfers the data through the first port to a destination in layer 3 network destination information corresponding to the IP address included in the data.

4. The transfer device according to claim 3, wherein
   when the transfer unit receives first data addressed to the communication device in the layer 2 network through the first port, the transfer unit searches the second destination information in the storage unit based on a destination IP address included in the first data, and transfers the first data through the first port to a destination in layer 3 network destination information corresponding to the destination IP address included in the first data, and
   when the transfer unit receives second data addressed to a communication device in the layer 3 network through the second port, the transfer unit searches the first destination information in the storage unit based on a source MAC address included in the second data, and transfers the second data through the first port to a destination in layer 3 network destination information corresponding to the source MAC address included in the second data.

5. The transfer device according to claim 3, wherein
when the transfer unit receives data through the first port and the received data is data addressed to the communication device in the layer 2 network, which has been transferred to the destination through the first port, the transfer unit transfers the received data through either of the first port or the second port.

6. The transfer device according to claim 3, wherein
when the transfer unit receives data addressed to the communication device in the layer 2 network through the first port, the transfer unit transfers the received data through the first port based on an IP address included in header information in the received data and the second destination information in the storage unit, to a destination in the layer 3 network indicated by the layer 3 network destination information corresponding to the IP address included in the header information.

7. The transfer device according to claim 3, wherein
when the control processing unit updates the first destination information or the address information in the storage unit in response to a predetermined trigger, the control processing unit updates the second destination information.

8. The transfer device according to claim 7, wherein
when the control processing unit updates the address information, the control processing unit searches the first destination information based on a MAC address in the updated address information to acquire layer 3 network destination information corresponding to the MAC address in the updated address information, and updates the second destination information based on the acquired layer 3 network destination information and an IP address in the updated address information.

9. The transfer device according to claim 1, wherein the information regarding processing of data is layer 3 network destination information regarding a destination of data in the layer 3 network, the data processing information is destination information with which the MAC address of the communication device in the layer 2 network and the layer 3 network destination information are brought into correspondence with each other,
depending on a search result of the destination information in a case of receiving the data addressed to the communication device in the layer 2 network, the transfer unit controls whether to transfer the data addressed to the communication device in the layer 2 network through the first port to a destination in layer 3 network destination information corresponding to the acquired MAC address, and depending on a search result of the destination information in a case of receiving the data addressed to the communication device in the layer 3 network, the transfer unit controls whether to transfer the data addressed to the communication device in the layer 3 network through the first port to a destination in layer 3 network destination information corresponding to the MAC address included in the data.

10. The transfer device according to claim 2, wherein
the transfer unit encapsulates the data using the layer 3 network destination information when transferring the data through the first port.

11. A transfer device comprising:
a first port connected to a layer 2 network;
a second port connected to a layer 3 network;
a first transfer unit connected to the first port;
a second transfer unit connected to the second port; and
a storage unit that stores destination information with which a media access control (MAC) address of a communication device in the layer 2 network and layer 3 network destination information regarding a destination of data in the layer 3 network are brought into correspondence with each other, and address information with which an internet protocol (IP) address and the MAC address of the communication device in the layer 2 network are brought into correspondence with each other, wherein
when the second transfer unit receives data addressed to the communication device in the layer 2 network through the second port, the second transfer unit transfers the data to the first transfer unit,
the first transfer unit searches the address information based on an IP address included in the data transferred from the second transfer unit to acquire a MAC address corresponding to the IP address included in the data, searches the destination information based on the acquired MAC address, and depending on a result of the search, executes either of transfer of the data through the first port to the communication device, or transfer of the data to the second transfer unit based on layer 3 network destination information corresponding to the acquired MAC address,
when the second transfer unit receives the data based on the layer 3 network destination information from the first transfer unit, the second transfer unit transfers the data to a destination in the layer 3 network destination information through the second port,
when the first transfer unit receives data addressed to a communication device in the layer 3 network through the first port, the first transfer unit searches the address information based on an IP address included in the data to acquire a MAC address corresponding to the IP address included in the data, searches the destination information based on the acquired MAC address, and depending on a result of the search, executes either of transfer of the data as first data to the second transfer unit, or transfer of the data as second data to the second transfer unit based on layer 3 network destination information corresponding to the acquired MAC address, and
when the second transfer unit receives the first data from the first transfer unit, the second transfer unit transfers the first data to the communication device in the layer 3 network through the second port, and when the second transfer unit receives the second data from the first transfer unit, the second transfer unit transfers the second data to the destination through the second port.

12. A transfer system comprising:
a first communication device connected to a layer 2 network;
a second communication device and a server connected to a layer 3 network; and
a transfer device connected to between the layer 2 network and the layer 3 network, wherein
the transfer device stores media access control (MAC) address-server correspondence information with which a MAC address of the first communication device and server-related information regarding the server are brought into correspondence with each other, and address information with which an internet protocol (IP) address and the MAC address of the first communication device are brought into correspondence with each other,
when the transfer device receives first data addressed to the first communication device from the second communication device, the transfer device searches the address information based on an IP address included in the first data to acquire a MAC address corresponding to the IP address included in the first data, searches the MAC address-server correspondence information based on the acquired MAC address, and depending on a result of the search, controls whether to transfer the first data to the server based on server-related information corresponding to the acquired MAC address, and when the transfer device receives second data addressed to the second communication device from the first communication device, the transfer device searches the MAC address-server correspondence information based on a MAC address included in the second data, and depending on a result of the search, controls whether to transfer the second data to the server based on server-related information corresponding to the MAC address included in the second data.

* * * * *